(12) United States Patent
Elshafie et al.

(10) Patent No.: US 11,765,731 B2
(45) Date of Patent: Sep. 19, 2023

(54) DISCRETE FOURIER TRANSFORM BASED UPLINK CONTROL INFORMATION DESIGN

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/156,082

(22) Filed: Jan. 22, 2021

(65) Prior Publication Data

US 2022/0240286 A1 Jul. 28, 2022

(51) Int. Cl.
*H04L 27/26* (2006.01)
*H04W 72/21* (2023.01)
*H04W 80/02* (2009.01)
*H04W 72/0453* (2023.01)
*H04W 76/27* (2018.01)
*H04W 72/0446* (2023.01)

(52) U.S. Cl.
CPC ......... *H04W 72/21* (2023.01); *H04L 27/2636* (2013.01); *H04W 72/0446* (2013.01); *H04W 72/0453* (2013.01); *H04W 76/27* (2018.02); *H04W 80/02* (2013.01)

(58) Field of Classification Search
CPC ......... H04W 72/1284; H04W 72/0413; H04W 72/0446; H04W 72/0453; H04W 76/27; H04W 80/02; H04L 27/2636
See application file for complete search history.

(56) References Cited

U.S. PATENT DOCUMENTS

| | | | | |
|---|---|---|---|---|
| 2010/0040162 A1* | 2/2010 | Suehiro | ............... | H04B 7/0697 375/295 |
| 2014/0286259 A1* | 9/2014 | Han | ..................... | H04W 72/02 370/329 |
| 2018/0302896 A1* | 10/2018 | Nayeb Nazar | ........ | H04L 5/0055 |

* cited by examiner

*Primary Examiner* — Dady Chery
(74) *Attorney, Agent, or Firm* — Arent Fox, LLP

(57) ABSTRACT

Example implementations include a method, apparatus and computer-readable medium of wireless communication. A user equipment (UE) may identify a discrete Fourier transform (DFT) matrix including a number of rows and columns based on scheduled physical uplink control channel (PUCCH) resources including a number of symbols in a time domain and a number of sub-carriers in a frequency domain. The UE may select a codepoint from a sequence pool derived from the DFT matrix based on a payload value of uplink control information (UCI) to be transmitted on the PUCCH resources. The UE may transmit the selected codepoint on the scheduled PUCCH resources.

25 Claims, 14 Drawing Sheets

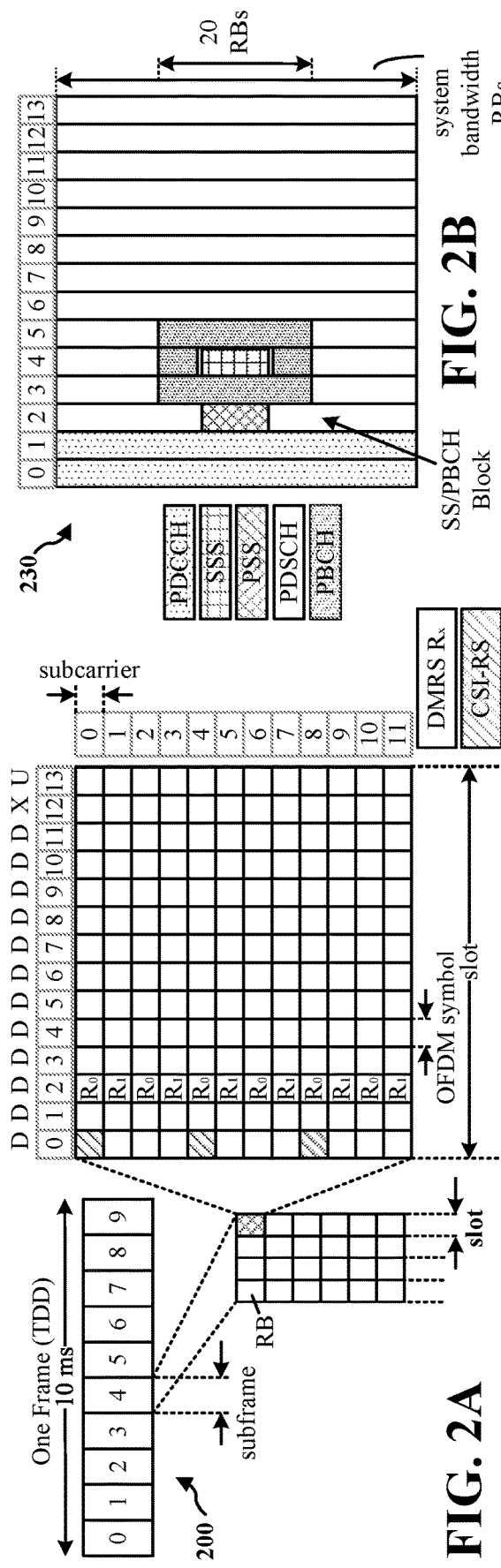
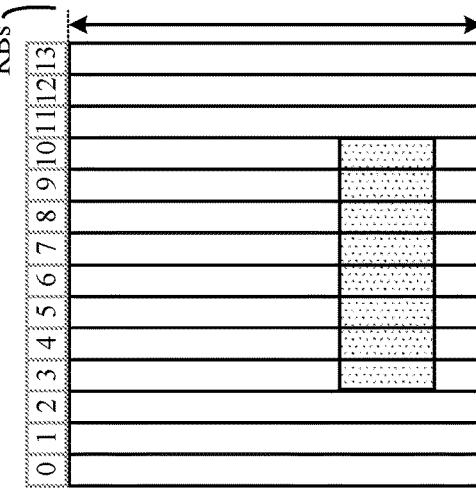
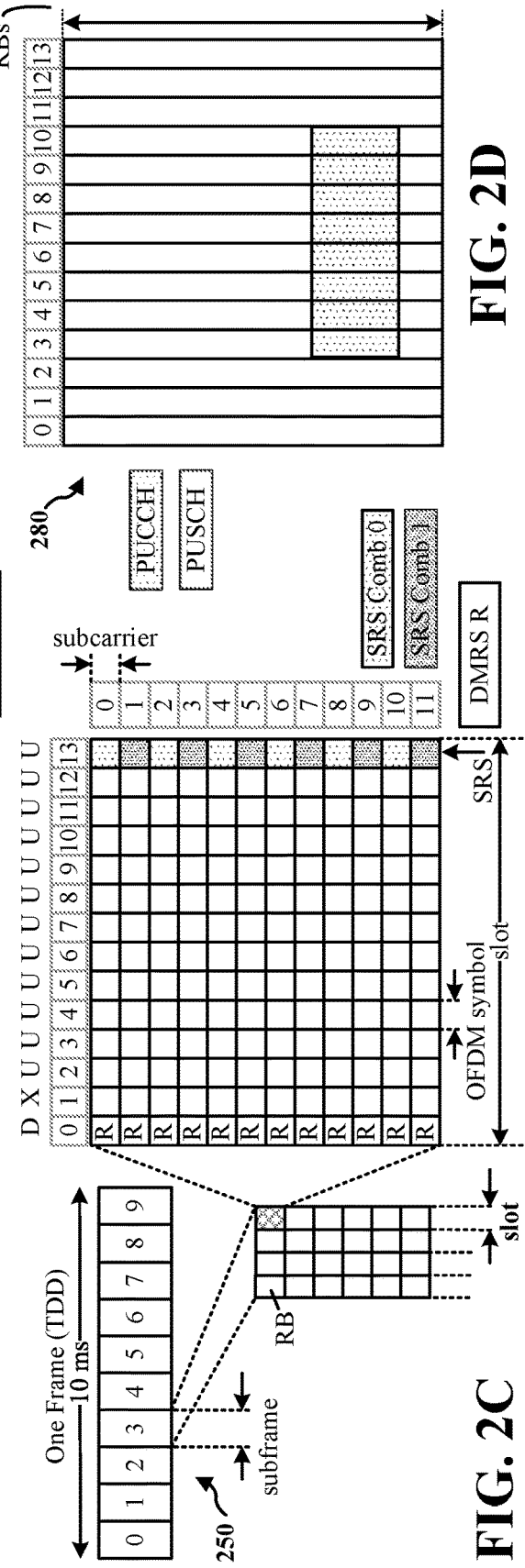

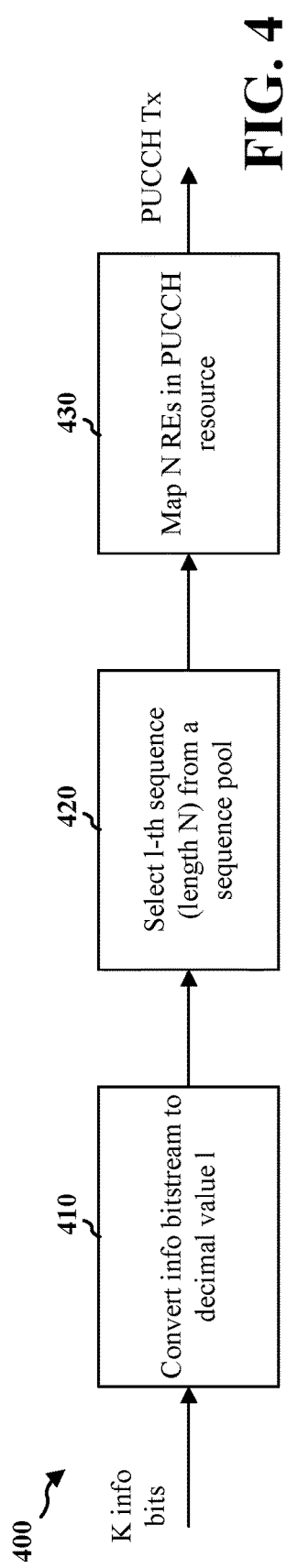
FIG. 4
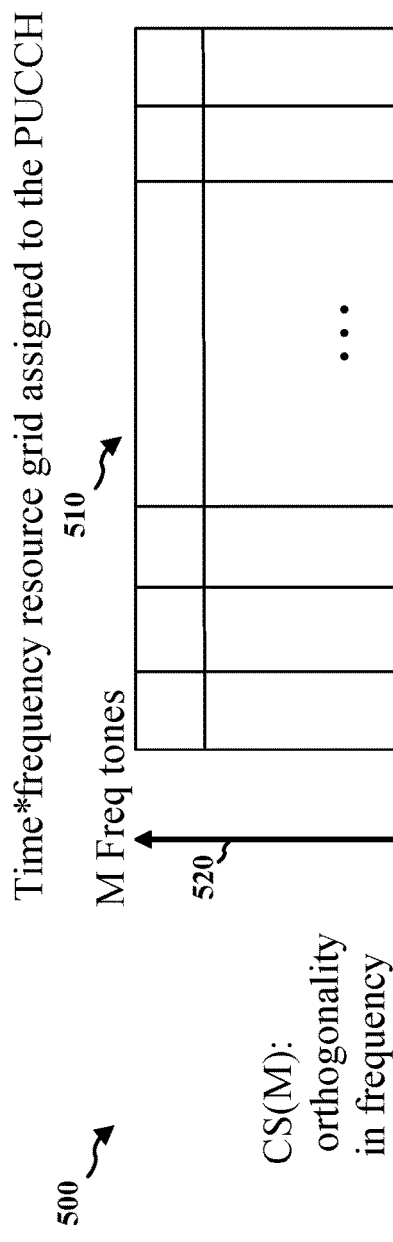
FIG. 5

$$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ 1 & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix}$$

$$\omega = e^{-j2\pi/N} \text{ or } e^{j2\pi/N}$$

FIG. 9

$$F = DFT_{MN} = \begin{bmatrix} 1 & 1 & 1 & \cdots & 1 \\ 1 & e^{\frac{j2\pi}{MN}} & e^{\frac{j2\pi(2)}{MN}} & \cdots & e^{\frac{j2\pi(MN-1)}{MN}} \\ 1 & e^{\frac{j2\pi(2)}{MN}} & e^{\frac{j2\pi(4)}{MN}} & \cdots & e^{\frac{j2\pi(2)MN-1}{MN}} \\ \vdots & \vdots & \vdots & \cdots & \vdots \\ 1 & e^{\frac{j2\pi(MN-1)}{MN}} & e^{\frac{j2\pi(MN-1)(2)}{MN}} & \cdots & e^{\frac{j2\pi(MN-1)(MN-1)}{MN}} \end{bmatrix}_{MN \times MN}$$

FIG. 10

$$F = DFT_{O_1N_1}\Big|_{N_1 \text{ columns}} = \begin{bmatrix} 1 & 1 & 1 & \cdots & 1 \\ 1 & e^{\frac{j2\pi}{O_1N_1}} & e^{\frac{j2\pi(2)}{O_1N_1}} & \cdots & e^{\frac{j2\pi(N_1-1)}{O_1N_1}} \\ 1 & e^{\frac{j2\pi(2)}{O_1N_1}} & e^{\frac{j2\pi(4)}{O_1N_1}} & \cdots & e^{\frac{j2\pi(2)(N_1-1)}{O_1N_1}} \\ \vdots & \vdots & \vdots & \cdots & \vdots \\ 1 & e^{\frac{j2\pi(O_1N_1-1)}{O_1N_1}} & e^{\frac{j2\pi(O_1N_1-1)(2)}{O_1N_1}} & \cdots & e^{\frac{j2\pi(O_1N_1-1)(N_1-1)}{O_1N_1}} \end{bmatrix}_{O_1N_1 \times N_1}$$

DISCRETE FOURIER TRANSFORM BASED UPLINK CONTROL INFORMATION DESIGN

BACKGROUND

Technical Field

The present disclosure relates generally to communication systems, and more particularly, to apparatuses and methods of transmitting a physical uplink control channel (PUCCH) carrying a discrete Fourier transform (DFT) based uplink control information (UCI).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment (UE). The method may include identifying a discrete Fourier transform (DFT) matrix including a number of rows and columns based on scheduled physical uplink control channel (PUCCH) resources including a number of symbols in a time domain and a number of sub-carriers in a frequency domain. The method may include selecting a codepoint from a sequence pool derived from the DFT matrix based on a payload value of uplink control information (UCI) to be transmitted on the PUCCH resources. The method may include transmitting the selected codepoint on the scheduled PUCCH resources.

The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

In an aspect, the disclosure provides method of wireless communication for a UE. The method may include identifying a DFT matrix including a number of rows and columns for scheduled PUCCH resources based on at least an oversampling factor and the scheduled PUCCH resources. The method may include selecting a codepoint from a sequence pool derived from the DFT matrix based on a codebook assigned to the UE and a payload value of UCI. The method may include transmitting the selected codepoint on the scheduled PUCCH resources The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

In another aspect, the disclosure provides a method of wireless communication for a base station. The method may include identifying a DFT matrix including a number of rows and columns based on scheduled PUCCH resources assigned to at least UE, the PUCCH resources including a number of symbols in a time domain and a number of sub-carriers in a frequency domain. The method may include receiving a PUCCH transmission on the scheduled PUCCH resources. The method may include correlating the received PUCCH transmission with each codepoint of the DFT matrix to select a payload value of UCI sent by the at least one UE that corresponds to the codepoint of the DFT matrix with a best correlation.

The disclosure also provides an apparatus (e.g., a base station) including a memory storing computer-executable instructions and at least one processor configured to execute the computer-executable instructions to perform the above method, an apparatus including means for performing the above method, and a computer-readable medium storing computer-executable instructions for performing the above method.

In another aspect, the disclosure provides a method of wireless communication for a base station. The method may include identifying a DFT matrix including a number of rows and columns based on at least an oversampling factor and a number of symbols in a time domain of scheduled PUCCH resources for one or more UEs. The method may include receiving one or more PUCCH transmissions on the scheduled PUCCH resources. The method may include correlating each of the one or more PUCCH transmissions with each codepoint of the DFT matrix to select a payload value of UCI sent by a respective UE that corresponds to the codepoint of the DFT matrix with a best correlation for a respective PUCCH transmission of the one or more PUCCH transmissions. The method may include determining the respective UE that sent the respective PUCCH transmission based on a codebook index of the codepoint of the DFT matrix with the best correlation.

The disclosure also provides an apparatus (e.g., a base station) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a UL channels within a subframe.

FIG. 4 is a diagram of an example process for sequence-based non-coherent physical uplink control channel (PUCCH) transmission.

FIG. 5 is a diagram of example PUCCH resources.

FIG. 9 is a diagram of an example DFT matrix based on a size of PUCCH resources.

FIG. 10 is a diagram of an oversampled DFT matrix.

DETAILED DESCRIPTION

Figure 1:
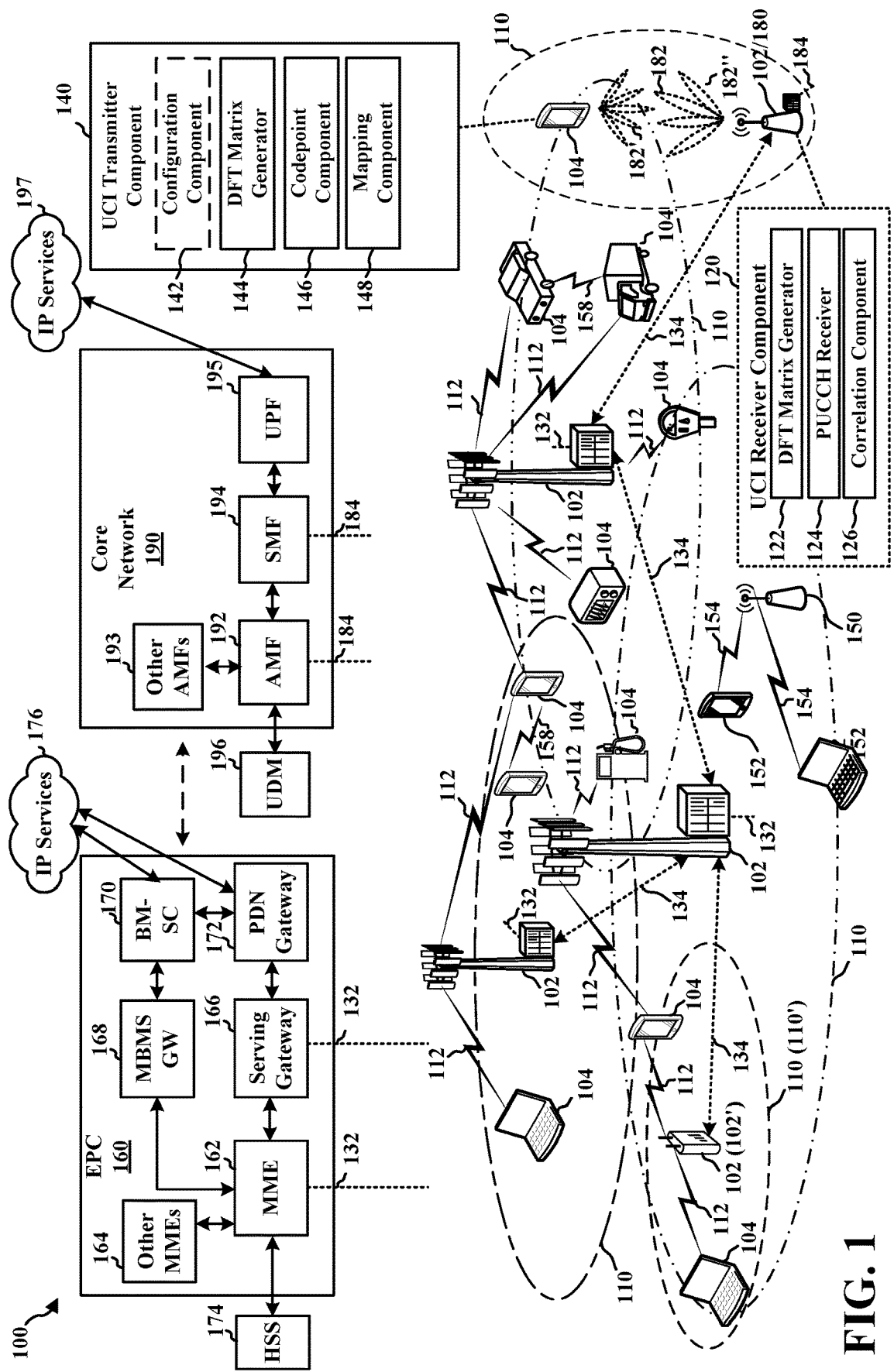
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A physical uplink control channel (PUCCH) may carry uplink control information (UCI) such as a scheduling request (SR), buffer status report (BSR), and/or an acknowledgment or negative acknowledgment (ACK/NAK). A conventional design for the PUCCH uses a demodulation reference signal (DMRS) based coherent transmission. The UCI may be multiplexed with the DMRS. At the base station, the DMRS may be used to estimate the channel for demodulating and decoding the UCI. DMRS-based coherent communication may suffer from significant performance loss at low signal to noise ratios (SNR). The DMRS-based coherent communication may include overhead for the DMRS, but channel estimation at low SNR may be poor. The channel code for PUCCH (e.g., Reed-Muller (RM) code for less than or equal to 11 bits) may not be optimized for low data rates.

An alternative PUCCH design may utilize a sequence-based DMRS-less non-coherent transmission for PUCCH with more than one bit of UCI. Orthogonal sequences may be utilized for small payload sizes (e.g., 1 or 2 bits), while non-orthogonal sequences may be utilized for medium or large payload sizes (e.g., 3 or more bits). In general the sequence-based DMRS-less non-coherent transmission may generate a sequence pool based on a discrete Fourier transform (DFT) and a cell specific sequence. A codebook may be generated based on the PUCCH payload size by selecting sequences from the sequence pool. The PUCCH payload bitstream may be converted to a decimal number (k) and the $k^{th}$ sequence in the codebook may be transmitted. The selected sequence may be cyclically shifted in the time domain. The cyclic shift, however, may not add extra information to the design when the DFT sequences are designed accurately. Additionally, multiples UEs may use the same constructed codebook.

In an aspect, the present disclosure provides a PUCCH and UCI design that expands the DFT to generate longer sequences. The longer sequences may be transmitted over multiple symbols in the time domain rather than repeating sequences with different cyclic shifts. The longer sequences may result in more robust reception. The PUCCH and UCI design may be adapted to frequency hopping and may tolerate DMRS for timing and Doppler estimation using rate matching or puncturing. In an aspect, the present disclosure provides sequences based on an oversampled DFT codebook. The oversampled DFT codebook may be generated based on a sub-matrix of a DFT matrix generated based on an oversampling factor. The oversampled DFT codebook may allow higher data rates while controlling interference. Each UE may be assigned a different set of orthogonal DFT codebooks. The different oversampled DFT codebooks may allow better multi-UE separation.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a UCI transmitter component 140 that transmits a UCI on PUCCH resources based on a DFT matrix. The UCI transmitter component 140 may include a configuration component 142 configured to receive a configuration message indicating the PUCCH resources. The UCI transmitter component 140 may include a DFT matrix generator configured to identify a DFT matrix. In some aspects, the DFT matrix may include a number of rows and columns based on the scheduled PUCCH resources including a number of symbols in a time domain and a number of sub-carriers in a frequency domain. In some aspects, the DFT matrix may include a number of rows and columns for the PUCCH resources based on at least an oversampling factor and the scheduled PUCCH resources. The UCI transmitter component 140 may include a codepoint component 146 configured to select a codepoint from a sequence pool derived from the DFT matrix based on a payload value of UCI to be transmitted on the PUCCH resources. The UCI transmitter component 140 may include a mapping component 148 configured to transmit the selected codepoint on the scheduled PUCCH resources.

In an aspect, one or more of the base station 102 may include a UCI receiver component 120 that receives PUCCH carrying a sequence indicating a UCI value. The UCI receiver component 120 may include, for example, a DFT matrix generator 122 configured to generate the same DFT matrix identified by the DFT matrix generator 144. The UCI receiver component 120 may include a PUCCH receiver 124 configured to receive a PUCCH transmission on the scheduled PUCCH resources. The UCI receiver component 120 may include a PUCCH receiver 124 configured to correlate the received PUCCH transmission with each codepoint of the DFT matrix to select a payload value of UCI sent by at least one UE that corresponds to the codepoint of the DFT matrix with a best correlation.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
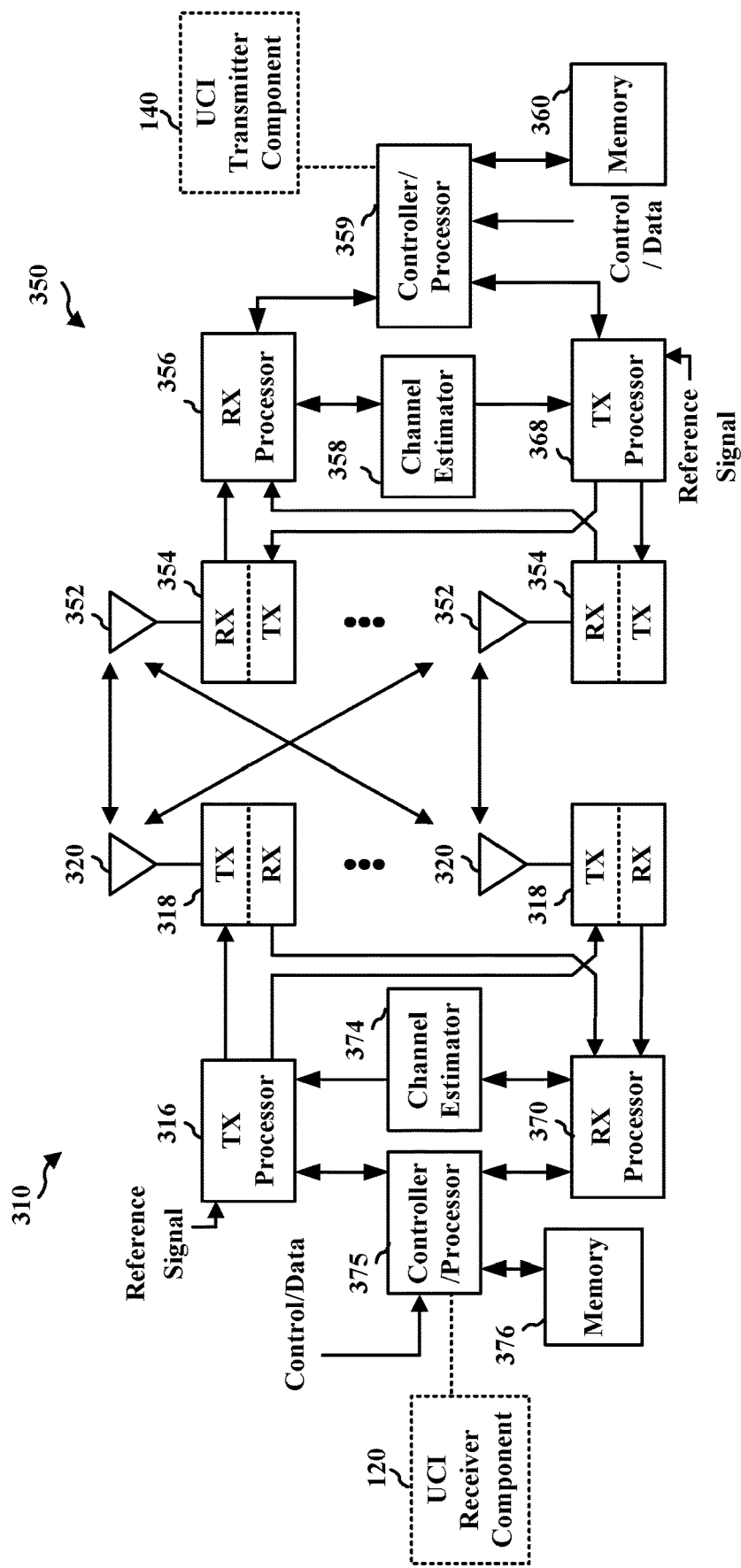
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UCI transmitter component 140 of FIG. 1.

At least one of the TX processor 316, the RX processor 370, and the controller/processor 375 may be configured to perform aspects in connection with the UCI receiver component 120 of FIG. 1.

FIG. 4 is a diagram illustrating an example procedure 400 for sequence based non-coherent PUCCH transmission. The UCI may include K information bits as a bitstream. At block 410, the K info bits may be converted to a decimal value (l). For example, the first bit of the bitstream may be a most significant bit when converting to the decimal value. At block 420, the $l^{th}$ sequence from the sequence pool may be selected. Each sequence may have a length of N. At block 430, the sequence may be mapped to N resource elements (REs) in the assigned PUCCH resources. The sequence may then be transmitted over the assigned PUCCH resources.

FIG. 5 is a diagram 500 of example PUCCH resources 510 that may be assigned to a UE. The PUCCH resources may include M frequency tones 520 and N OFDM symbols 530. The sequence pool for sequence based non-coherent PUCCH transmission may be generated based on the PUCCH resources 510. For example, the sequence pool may have dimensions of N×M. The sequence pool may be generated based on DFT(n)*S (CS index m), where DFT(n) is the $n^{th}$ element of a column or row of an N×N DFT matrix; * is the Kronecker product; n=0,1, . . . , N-1; and m=0,1, . . . ,M-1; and S is a cell specific low peak to average power ratio (PAPR) sequence with length M. For example, the PUCCH resources 510 may be a full resource block (RB) of N=14 OFDM symbols and M=12 tones. The PUCCH resources 510 can generate 168 orthogonal codepoints/sequences that can carry at most a 7-bit payload, which may be represented as 128 different codepoints.

The PUCCH payload size may be represented as K. The UE 104 may generate a constructed codebook with size $2^K$ by selecting $2^K$ codepoints from the N*M sequence pool of orthogonal codepoints/sequences. For example, the first $2^K$ codepoints may be selected, or the base station 102 may indicate which columns of the DFT matrix to include in the codebook.

To transmit the PUCCH payload of K bits, which may be represented as $b_0 b_1 b_2 \ldots b_{K-1}$, the UE 104 may convert the payload bit steam $b_0 b_1 b_2 \ldots b_{K-1}$ into a decimal number k. The UE may transmit the $k^{th}$ codepoint in the constructed codebook.

Figures 6, 7:
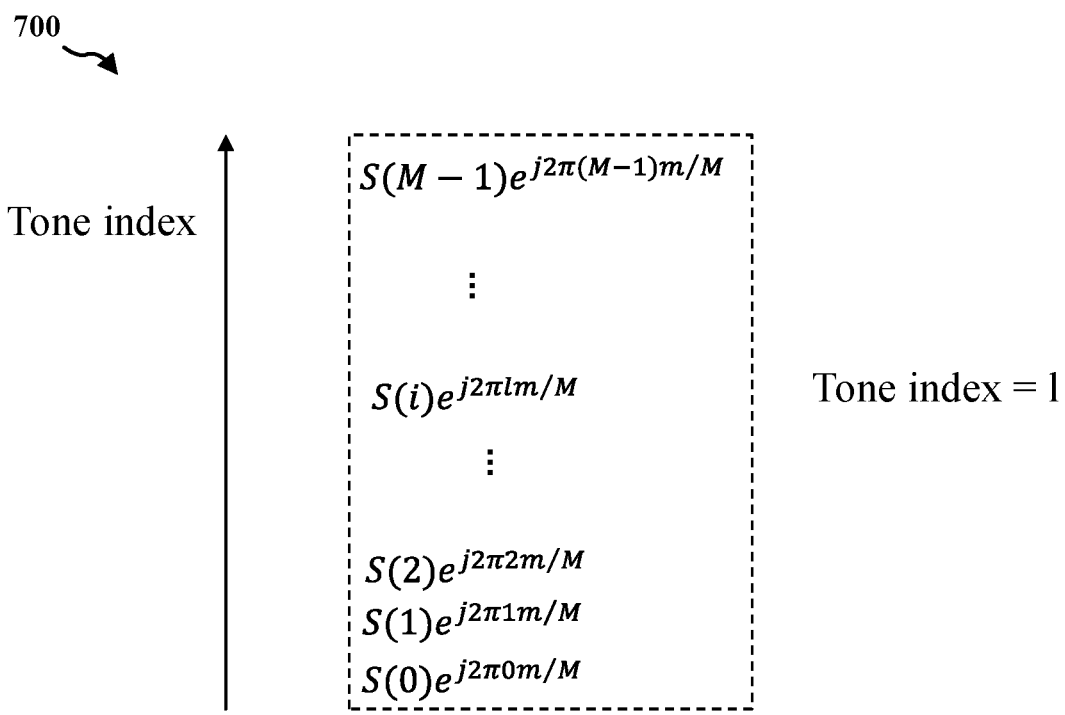
FIG. 6 is a diagram of an example discrete Fourier transform matrix.
FIG. 7 is a diagram of an example cell specific sequence with cyclic shift applied to tones of PUCCH resources.

In an aspect, the N*M orthogonal sequences pool may be generated based on DFT(n)*S (CS index m). FIG. 6 is an example DFT matrix 600 with dimensions N×N. DFT N(n) may represent the $n^{th}$ row 610 or the $n^{th}$ column 620 drawn from the DFT matrix 600. Omega (ω) may represent $e^{-j2\pi/N}$ or $e^{j2\pi/N}$. Accordingly, DFT_N (n) may be represented as DFT(n)=[$w^{0n}, w^{1n}, w^{2n}, \ldots, w^{in} \ldots, w^{(N-1)n}$].

S (CS index m) is the frequency domain base sequence S with cyclic shift (m) in time domain, or equivalently with phase ramp $e^{j2\pi im/M}$ or $e^{-j2\pi im/M}$ on each $l^{th}$ tone. FIG. 7 is an example base sequence (S) 700.

Figure 8:
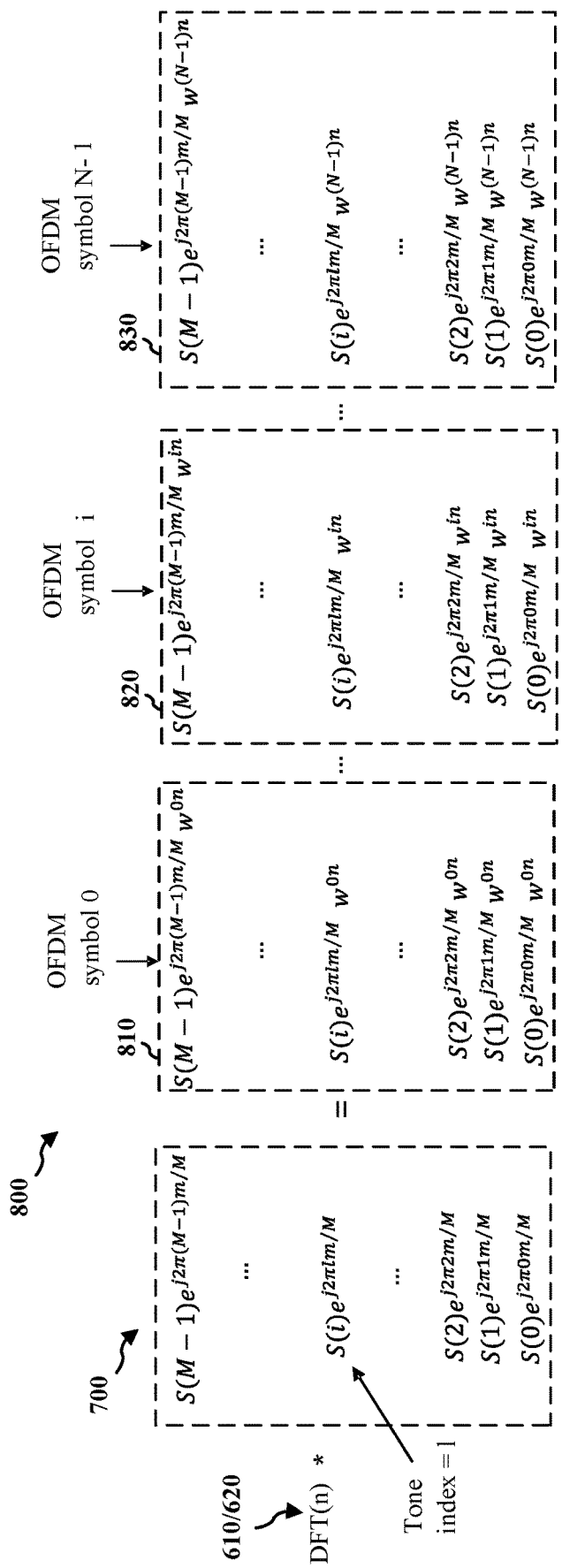
FIG. 8 is a diagram of a sequence-based PUCCH transmission with cyclically shifted sequences on each orthogonal frequency division multiplexing (OFDM) symbol.

FIG. 8 is an example sequence pool 800. The resource pool 800 may be generated based on the row 610 or column 620 of the DFT matrix 600 and the base sequence S 700 with a cyclic shift in the time domain. For example OFDM symbol 810 may be a first OFDM symbol (e.g., index 0), OFDM symbol 820 may be the $i^{th}_{Symbol}$ (e.g., index i-1), and OFDM symbol 830 may be the last OFDM symbol (e.g., index N-1). The OFDM symbol 820 may include the same information as the OFDM symbol 810, but shifted.

In an aspect, the present disclosure provides for PUCCH transmission using a non-coherent UCI design using longer sequences and no cyclic shift. The sequences may be drawn from a column of a DFT matrix having a size based on the PUCCH resources. In a first example, the size of the DFT matrix may be based on the number of symbols (N) in the time domain and the number of sub-carriers (M) in the frequency domain. For instance, the DFT matrix may be a MN×MN matrix. Because each column of an MN×MN matrix includes MN elements, each column may be selected as a codepoint and mapped to the MN resource elements of the PUCCH resources.

FIG. 9 illustrates an example MN×MN DFT matrix 900. Each column of the matrix 900 may serve as the basis for a codepoint. For example, column 910 may provide a first codepoint corresponding to K=0, column 920 may provide a second codepoint corresponding to K=1, column 930 may provide a third codepoint corresponding to K=2, and column 940 may provide an $MN^{th}$ codepoint corresponding to K=MN-1. Accordingly, the matrix 900 may provide MN codepoints. In an aspect, the cell specific sequence (e.g., S 700) may be combined with the matrix 900 to provide the codepoints. For example, the codepoint may be selected from a resulting matrix of the Kronecker product between the DFT matrix and the cell specific sequence. Similar to the above example of the PUCCH resources 510 being a full RB of N=14 OFDM symbols and M=12 tones, the matrix 900 may generate 168 orthogonal codepoints/sequences that can carry at most a 7-bit payload, which may be represented as 128 different codepoints. In contrast to the sequence pool 800, each sequence of the matrix 900 may include different information. In an aspect, the use of longer sequences may make reception using correlation more robust. In another aspect, the use of longer sequences may improve tolerance to a DMRS transmitted on the PUCCH resources. For example, the sequence may be rate matched around the DMRS, or the sequence may be punctured by the DMRS.

In another aspect, the present disclosure provides a UCI design based on an oversampled DFT matrix. The oversampled DFT matrix may allow higher data rates at the cost of allowing some interference between selected DFT vectors of the DFT matrix. In another aspect, the oversampled DFT matrix may provide separation of users by generating codebooks from the oversample DFT matrix using orthogonal cover codes. Each UE may be assigned a different orthogonal codebook selected from the DFT matrix. While there may be some interference between the codebooks of different UEs because the different codebooks may not be orthogonal to each other, there may be better separation than UEs using the same codebook.

In an aspect, the oversampled DFT matrix may be generated based on a size of the PUCCH resources ($N_1$) and an oversampling factor ($O_1$). In one example, the N×N matrix 600 may be oversampled. That is, $N_1$ may equal the number of symbols N. In another example, the matrix 900 may be oversampled. That is $N_1$ may be equal to MN. In either case, the oversampled matrix may be generated by selecting a sub-matrix of an $O_1N_1 \times O_1N_1$ DFT matrix.

FIG. 10 illustrates an example oversampled DFT matrix 1000 including the first N columns of an $O_1N_1 \times O_1N_1$ DFT matrix. Where $N_1$ is equal to N, the DFT matrix 1000 may be combined with the cell specific sequence to generate MN codepoints, and the sequence selected based on the codepoint may be cyclically shifted in each OFDM symbol. Where $N_1$ is equal to MN, the MN columns of the DFT matrix 1000 may serve as the basis for the MN codepoints. In an aspect, the Kronecker product of the DFT matrix 1000 and the cell specific sequence may provide the sequences without cyclic shifting.

In an aspect, the rows of the DFT matrix 1000 may not be orthogonal to each other. Orthogonal codebooks may be generated by selecting sets of rows based on $O_1$. For example, where $O_1$ is 4, a first set may include rows with indices 0, 4, 8, 12, . . . ; a second set may include rows with indices 1, 5, 9, 13; a third set may include rows with indices 2, 6, 10, 14 . . . ; and a fourth set may include rows with indices 3, 7, 11, 15 . . . That is, the DFT matrix 1000 may be divided into submatrices, where each submatrix provides an orthogonal codebook. Written differently, submatrix i may be denoted $\tilde{F}_i$, where i=1,2, . . . , 0, then $\tilde{F}_i \widetilde{F_j^*} = I_{N_1N_2 \times N_1N_2} \delta_{ij}$ with $\delta_{ij}=1$ for i=j and zero otherwise. The codepoints may correspond to the columns of the sub-matrix. For example, column 1010 may provide a first codepoint corresponding to K=0 for a selected codebook, column 1020 may provide a second codepoint corresponding to K=1 for the selected codebook, column 1030 may provide a third codepoint corresponding to K=2 for the selected codebook, and column 1040 may provide an MN$^{th}$ codepoint corresponding to K=MN−1 for the selected codebook.

In an aspect, a base station may signal the oversampling factor ($O_1$). For example, the oversampling factor may be signaled via RRC, MAC-CE, or DCI. Where the oversampling is used to separate UEs, each UE may be assigned a codebook index. The codebook index may be signaled via UE specific signaling. If base station uses a non-orthogonal codebook for one or more UEs, the base station may send an indication of the codebook. For example the indication of the codebooks may identify the columns of the DFT matrix for the UE to include in the codebook. For example, the base station may inform a UE to use the first K columns of the oversampled DFT matrix 1000.

Figure 11:
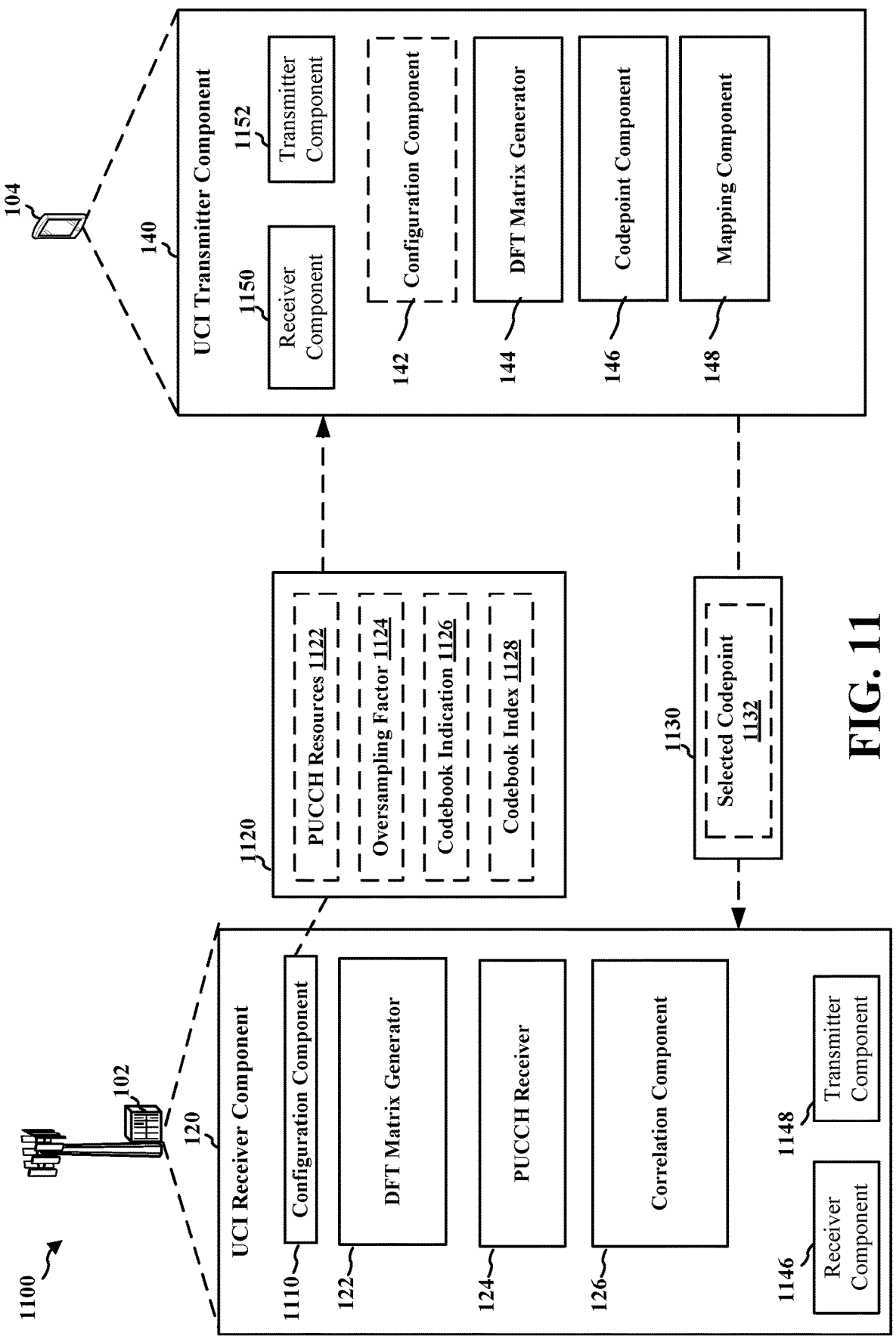
FIG. 11 is a diagram of example communications and components of a base station and a UE.

FIG. 11 is a diagram 1100 illustrating example communications and components of a base station 102 and a UE 104. The UE 104 may include the UCI transmitter component 140. The base station 102 may include the UCI receiver component 120.

The UCI receiver component 120 may include a configuration component 1110 that transmits signaling 1120, which may include one or more configuration messages that provide for DFT matrix based PUCCH transmissions. In an aspect, the configuration component 1110 may transmit an indication of PUCCH resources 1122. In some implementations where oversampling is used, the configuration component 1110 may transmit an indication of an oversampling factor 1124 and a codebook index 1128. The configuration component 1110 may transmit a codebook indication 1126, which may identify columns of the DFT matrix to include in the codebook. For example, the configuration component 1110 may transmit one or more of a radio resource control (RRC) message, a media access control-control element (MAC-CE), or a downlink control information (DCI).

The base station 102 may include a receiver component 1146, which may include, for example, a radio frequency (RF) receiver for receiving the signals described herein. The base station 102 may include a transmitter component 1148, which may include, for example, an RF transmitter for transmitting the signals described herein. In an aspect, the receiver component 1146 and the transmitter component 1148 may be collocated in a transceiver.

As discussed above regarding FIG. 1, the UE 104 may include the UCI transmitter component 140 including the configuration component 142, the DFT matrix generator 144, the codepoint component 146, and the mapping component 148. The UE 104 may also include a receiver component 1150 and a transmitter component 1152. The receiver component 1150 may include, for example, a RF receiver for receiving the signals described herein. The transmitter component 1152 may include for example, an RF transmitter for transmitting the signals described herein. In an aspect, the receiver component 1150 and the transmitter component 1152 may be collocated in a transceiver.

The configuration component 142 may receive the signaling 1120 including one or more configuration messages. The configuration component 142 may, for example, extract the PUCCH resources 1122, oversampling factor 1124, codebook indication and/or codebook index 1128 from the signaling 1120.

The DFT matrix generator 144 may identify a DFT matrix based on at least the PUCCH resources 1122. The codepoint component 146 may select a codepoint from a sequence pool derived from the DFT matrix based on a payload value of UCI to be transmitted on the PUCCH resources 1122. The mapping component 148 may transmit the selected codepoint 1132 on the scheduled PUCCH resources 1122. For example, the mapping component 148 may map the selected codepoint 1132 to the scheduled PUCCH resources 1122 for transmission as a PUCCH 1130.

The DFT matrix generator 122 may identify the DFT matrix based on at least the PUCCH resources 1122 in the same manner as the DFT matrix generator 144. Accordingly, the UCI receiver component 120 and the UCI transmitter component 140 may share the same DFT matrix for the PUCCH resources 1122. The PUCCH receiver 124 may receive the PUCCH 1130. The PUCCH receiver 124 may correlate the PUCCH 1130 with each codepoint of the DFT matrix to select a payload value of UCI sent by the UE 104 that corresponds to the codepoint of the DFT matrix with a best correlation for the PUCCH transmission.

Figure 12:
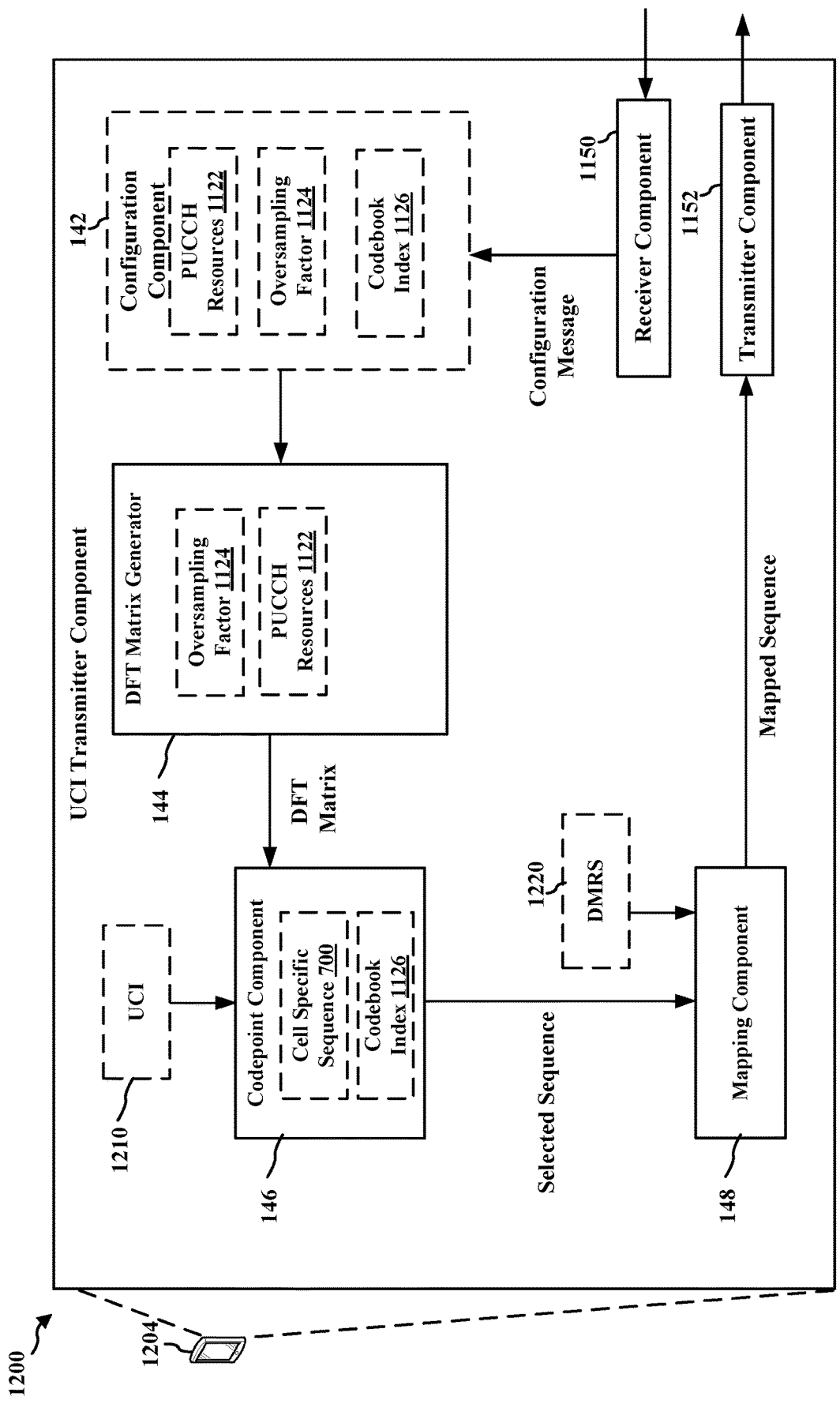
FIG. 12 is a conceptual data flow diagram illustrating the data flow between different means/components in an example UE.

FIG. 12 is a conceptual data flow diagram 1200 illustrating the data flow between different means/components in an example UE 1204, which may be an example of the UE 104 including the UCI transmitter component 140.

The receiver component 1150 may receive downlink signals including the signaling 1120. The receiver component 1150 may pass any configuration messages included in the signaling 1120 to the configuration component 142.

The configuration component 142 may receive the signaling 1120 and extract one or more of the PUCCH resources 1122, the oversampling factor 1124, the codebook indication 1126, or the codebook index 1128. The configuration component 142 may provide at least the PUCCH resources 1122 to the DFT matrix generator. In implementations utilizing oversampling, the configuration component 142 may provide the oversampling factor 1124 to the DFT matrix generator 144 and provide the codebook index 1128 to the codepoint component 146.

The DFT matrix generator 144 may identify a DFT matrix for the PUCCH resources 1122 based on at least the PUCCH resources 1122. For example, the DFT matrix generator 144 may identify a DFT matrix 900 including a number of rows and columns based on the PUCCH resources 1122 including a number of symbols in a time domain and a number of sub-carriers in a frequency domain. For instance, the DFT matrix 900 may be a MN×MN matrix where N is the number of symbols and M is the number of sub-carriers. In some implementations, where the PUCCH resources 1122 have a frequency hopping pattern, the DFT matrix generator 144 may identify a separate DFT matrix for each hop of the frequency hopping pattern. In another aspect, the DFT matrix generator 144 may identify a DFT matrix 1000 including a number of rows and columns for the PUCCH resources 1122 based on at least the oversampling factor 1124 and the scheduled PUCCH resources 1122. For instance, the DFT matrix generator 144 may determine an ON×ON matrix, where O is the oversampling factor 1124 and N is based on at least a number of symbols in a time domain of the scheduled PUCCH resources 1122. In some implementations, N is the number of symbols in the time domain of the scheduled PUCCH resources 1122. In some implementations, N is a product of the number of symbols in the time domain of the scheduled PUCCH resources 1122 and a number of sub-carriers in the frequency domain of the scheduled PUCCH resources 1122. The DFT matrix generator 144 may provide the DFT matrix to the codepoint component 146

The codepoint component 146 may select a codepoint from a sequence pool derived from the DFT matrix based on a payload value of a UCI 1210 to be transmitted on the PUCCH resources 1122. The UCI 1210 may be received from higher layers (e.g., a layer 3 HARQ ACK/NACK process). The UCI 1210 may be a bitstream indicating one or more of HARQ ACK/NACK, SR, or BSR. The codepoint component 146 may convert the bitstream of the UCI to the payload value, which may be a decimal number (e.g., an integer or a whole number). The codepoint component 146 may use the payload value as an index into the sequence pool to select the codepoint. In an aspect, the codepoint may be a column of the DFT matrix 900 or of a Kronecker product thereof. For example, the codepoint component 146 may derive a sequence pool by determining the Kronecker product between the DFT matrix 900 and the cell specific sequence 700. In another aspect, the codepoint may be selected from a sub-matrix of the Kronecker product of the DFT matrix 1000 and the cell specific sequence 700. The codepoint component 146 may select a sequence corresponding to the selected codepoint to the mapping component 148.

The mapping component 148 may transmit the selected codepoint on the scheduled PUCCH resources 1122. For example, the mapping component 148 may map the selected sequence to the OFDM symbols of the PUCCH resources 1122. In an aspect, the sequence length may be the same as the number of OFDM symbols of the PUCCH resources 1122. In an aspect, the PUCCH resources 1122 may also carry a DMRS 1220, which may provide timing and Doppler estimation. The mapping component 148 may rate match around OFDM symbols assigned to the DMRS 1220. Alternatively, the mapping component 148 may puncture the PUCCH transmission with the DMRS 1220. That is, the mapping component 148 may map the DMRS to some of the OFDM symbols instead of the selected sequence. The mapping component 148 may provide the mapped sequence (with or without DMRS 1220) to the transmitter component 1152 for transmission.

Figure 13:
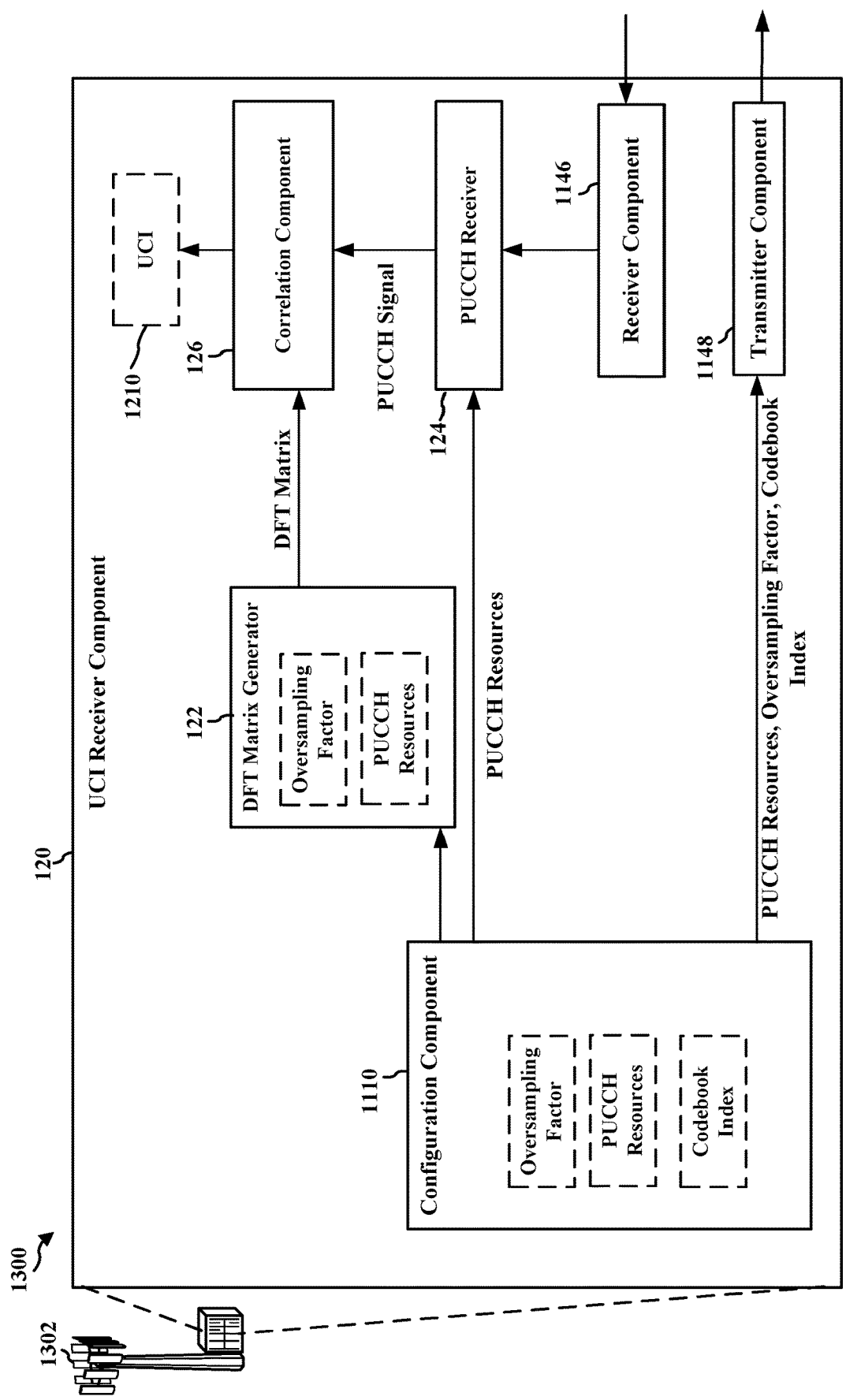
FIG. 13 is a conceptual data flow diagram illustrating the data flow between different means/components in an example base station.

FIG. 13 is a conceptual data flow diagram 1300 illustrating the data flow between different means/components in an example base station 1302 which may be an example of the base station 102 and include the UCI receiver component 120.

The configuration component 1110 may determine the PUCCH resources 1122. The configuration component 1110 may optionally determine the oversampling factor 1124 and the codebook index 1128. The configuration component 1110 may provide one or more of the PUCCH resources 1122, the oversampling factor 1124, or the codebook index 1128 to the transmitter component 1146 for transmission to the UE 104, 1204. The configuration component 1110 may provide the PUCCH resources 1122 to the PUCCH receiver 124. The configuration component 1110 may provide the PUCCH resources 1122 and/or the oversampling factor to the DFT matrix generator 122. The configuration component 1110 may provide the codebook index to the correlation component 126.

The DFT matrix generator 122 may identify a DFT matrix for the PUCCH resources 1122 based on at least the PUCCH resources 1122. For example, the DFT matrix generator 122 may identify a DFT matrix 900 including a number of rows and columns based on the PUCCH resources 1122 including a number of symbols in a time domain and a number of sub-carriers in a frequency domain. For instance, the DFT matrix 900 may be a MN×MN matrix where N is the number of symbols and M is the number of sub-carriers. In some implementations, where the PUCCH resources 1122 have a frequency hopping pattern, the DFT matrix generator 122 may identify a separate DFT matrix for each hop of the frequency hopping pattern. In another aspect, the DFT matrix generator 122 may identify a DFT matrix 1000 including a number of rows and columns for the PUCCH resources 1122 based on at least the oversampling factor 1124 and the scheduled PUCCH resources 1122. For instance, the DFT matrix generator 122 may determine an ON×ON matrix, where O is the oversampling factor 1124 and N is based on at least a number of symbols in a time domain of the scheduled PUCCH resources 1122. In some implementations, N is the number of symbols in the time domain of the scheduled PUCCH resources 1122. In some implementations, N is a product of the number of symbols in the time domain of the scheduled PUCCH resources 1122 and a number of sub-carriers in the frequency domain of the scheduled PUCCH resources 1122. The DFT matrix generator 122 may provide the DFT matrix to the correlation component 126.

The receiver component 1146 may receive uplink signals including the PUCCH 1130. The receiver component 1146 may pass the uplink signals to the PUCCH receiver 124.

The PUCCH receiver 124 may identify the PUCCH resources 1122 and a received PUCCH signal on the PUCCH resources 1122. In some implementations, the PUCCH receiver 124 may use a DMRS 1220 within the PUCCH resources 1122 to estimate timing and/or Doppler. The PUCCH receiver 124 may provide the received PUCCH signal to the correlation component 126.

The correlation component 126 may correlate the received PUCCH transmission with each codepoint of the DFT matrix to select a payload value of UCI 1220 sent by the at least one UE 104 that corresponds to the codepoint of the DFT matrix with a best correlation. For example, the correlation component 126 may perform a fast Fourier transform (FFT) operation on the received PUCCH transmission and the DFT matrix. The FFT operation may produce a vector of correlation values corresponding to each codepoint of the DFT matrix. In some aspects, where the PUCCH resources 1122 carry the DMRS 1220, the correlation component 126 may perform rate matching (e.g., by removing OFDM symbols that carry the DMRS 1220) prior to performing the correlation. In an aspect, the correlation component 126 may further determine a UE that sent the PUCCH transmission based on a codebook index of the codepoint of the DFT matrix with the best correlation. That is, the correlation component 126 may determine that the UE assigned the codebook index is the UE that transmitted the PUCCH transmission.

Figure 14:
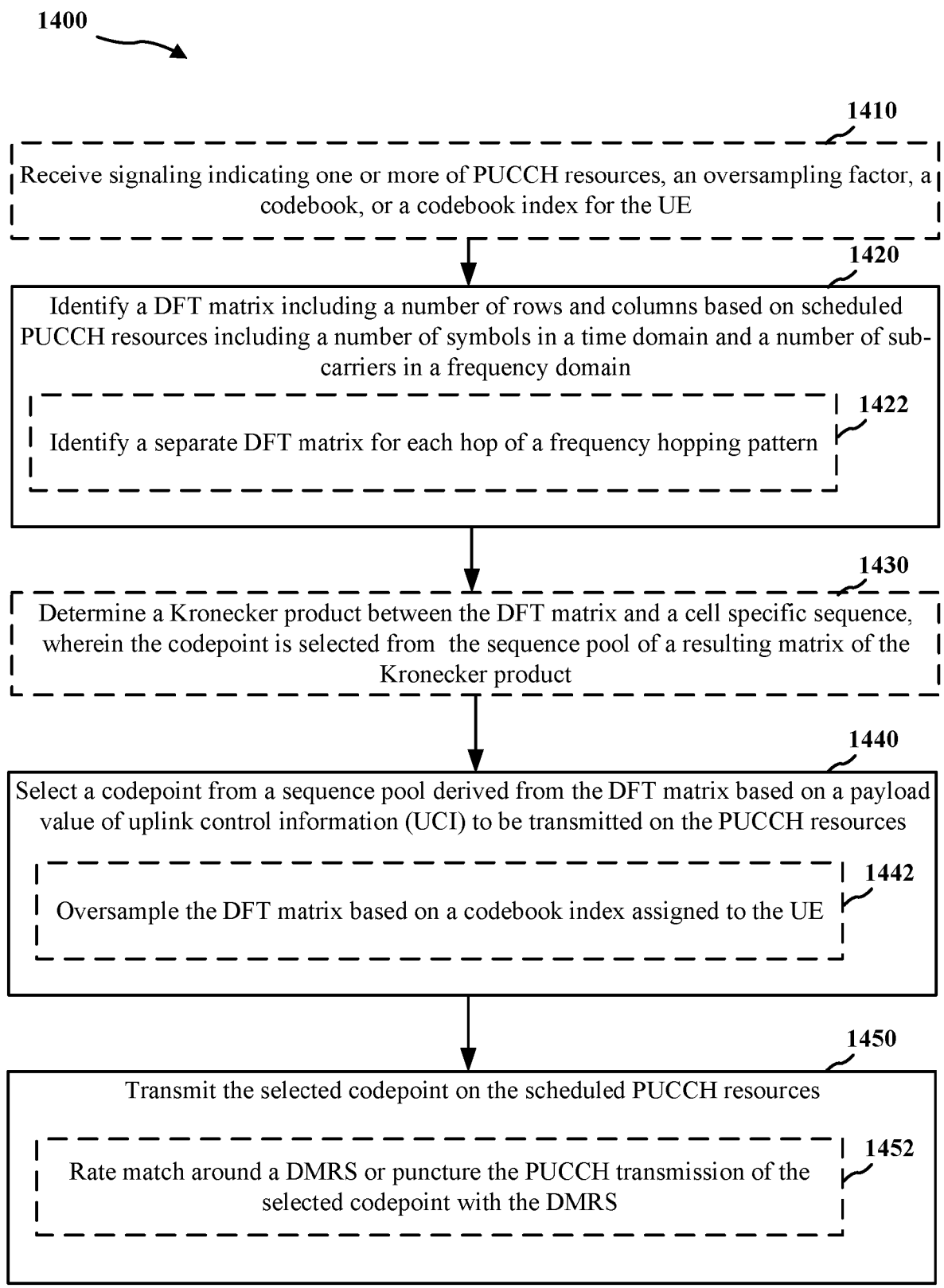
FIG. 14 is a flowchart of an example of a method of PUCCH transmission based on a DFT matrix for a UE.

FIG. 14 is a flowchart of an example method 1400 for transmitting UCI based on a DFT matrix. The method 1400 may be performed by a UE (such as the UE 104, which may include the memory 360 and which may be the entire UE 104 or a component of the UE 104 such as the UCI transmitter component 140, TX processor 368, the RX processor 356, or the controller/processor 359). The method 1400 may be performed by the UCI transmitter component 140 in communication with the UCI receiver component 120 of the base station 102.

At block 1410, the method 1400 may optionally include receiving signaling indicating one or more of PUCCH resources, an oversampling factor, a codebook, or a codebook index for the UE. In an aspect, for example, the UE 104, the RX processor 356 and/or the controller/processor 359 may execute the UCI transmitter component 140 and/or the configuration component 142 to receive signaling indicating one or more of PUCCH resources 1122, an oversampling factor 1124, a codebook indication 1126, or a codebook index 1128 for the UE. Accordingly, the UE 104, the RX processor 356, and/or the controller/processor 359 executing the UCI transmitter component 140 and/or the configuration component 142 may provide means for receiving signaling indicating one or more of PUCCH resources, an oversampling factor, a codebook, or a codebook index for the UE.

At block 1420, the method 1400 may include identifying a DFT matrix including a number of rows and columns based on scheduled PUCCH resources including a number of symbols in a time domain and a number of sub-carriers in a frequency domain. In an aspect, for example, the UE 104, the TX processor 368 and/or the controller/processor 359 may execute the UCI transmitter component 140 and/or the DFT matrix generator 144 to identify a DFT matrix 900 including a number of rows and columns based on scheduled PUCCH resources including a number of symbols in a time domain and a number of sub-carriers in a frequency domain.

In an aspect, the DFT matrix 900 is a MN×MN matrix, where N is the number of symbols and M is the number of sub-carriers. In an aspect, in sub-block 1422, the block 1420 may include identifying a separate DFT matrix for each hop of a frequency hopping pattern. For example, when the PUCCH resources have a frequency hopping pattern, the sub-block 1422 may be performed. Accordingly, the UE 104, the TX processor 368, and/or the controller/processor 359 executing the UCI transmitter component 140 and/or the DFT matrix generator 144 may provide means for identifying a DFT matrix including a number of rows and columns based on scheduled PUCCH resources including a number of symbols in a time domain and a number of sub-carriers in a frequency domain.

At block 1430, the method 1400 may optionally include determining a Kronecker product between the DFT matrix and a cell specific sequence. In an aspect, for example, the UE 104, the TX processor 368 and/or the controller/processor 359 may execute the UCI transmitter component 140 and/or the codepoint component 146 to determine a Kronecker product between the DFT matrix 900 and a cell specific sequence 700. Accordingly, the UE 104, the TX processor 368, and/or the controller/processor 359 executing the UCI transmitter component 140 and/or the codepoint component 146 may provide means for determining a Kronecker product between the DFT matrix and a cell specific sequence.

At block 1440, the method 1400 may include selecting a codepoint from a sequence pool derived from the DFT matrix based on a codebook assigned to the UE and a payload value of UCI. In an aspect, for example, the UE 104, the TX processor 368 and/or the controller/processor 359 may execute the UCI transmitter component 140 and/or the codepoint component 146 select a codepoint from a sequence pool derived from the DFT matrix based on a codebook assigned to the UE and a payload value of UCI. For example, when the block 1530 is performed, the codepoint may be selected from the sequence pool of a resulting matrix of the Kronecker product. In an aspect, in sub-block 1442, the block 1440 may include oversampling the DFT matrix based on a codebook index assigned to the UE. For example, the codepoint component 146 may select a set of orthogonal rows of the DFT matrix based on the codebook index. Accordingly, the UE 104, the TX processor 368, and/or the controller/processor 359 executing the UCI transmitter component 140 and/or the configuration component 142 may provide means for selecting a codepoint from a sequence pool derived from the DFT matrix based on a codebook assigned to the UE and a payload value of UCI.

At block 1450, the method 1400 may include transmitting the selected codepoint on the scheduled PUCCH resources. In an aspect, for example, the UE 104, the TX processor 368 and/or the controller/processor 359 may execute the UCI transmitter component 140 and/or the mapping component 148 to transmit the selected codepoint on the scheduled PUCCH resources 1122. In an aspect, at sub-block 1452, the block 1450 may include rate matching around a DMRS or puncturing the PUCCH transmission of the selected codepoint with the DMRS. Accordingly, the UE 104, the TX processor 368, and/or the controller/processor 359 executing the UCI transmitter component 140 and/or the configuration component 142 may provide means for transmitting the selected codepoint on the scheduled PUCCH resources.

Figure 15:
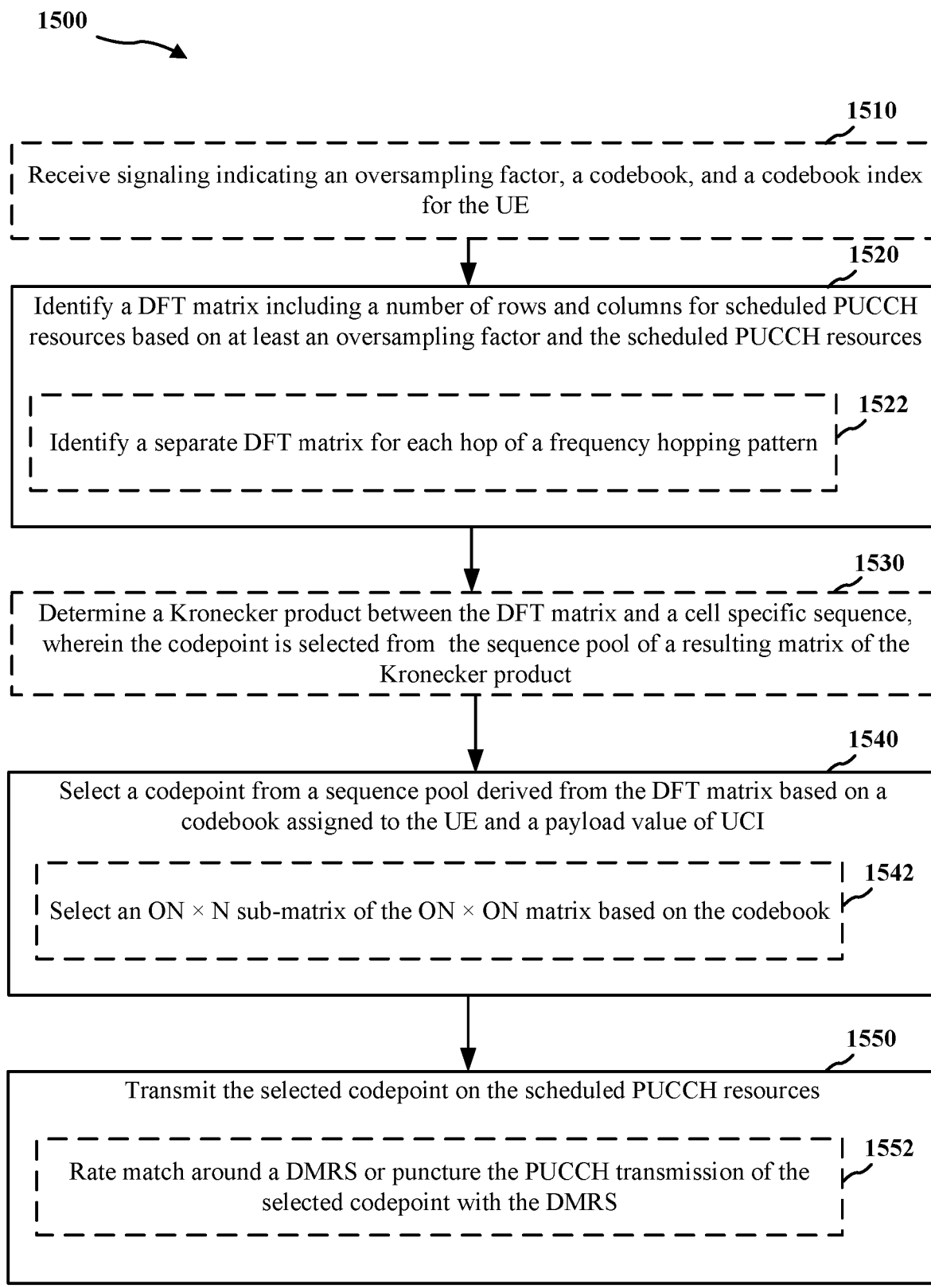
FIG. 15 is a flowchart of an example of a method of PUCCH transmission based on an oversampled DFT matrix for a UE.

FIG. 15 is a flowchart of an example method 1400 for transmitting UCI based on a DFT matrix. The method 1500 may be performed by a UE (such as the UE 104, which may include the memory 360 and which may be the entire UE 104 or a component of the UE 104 such as the UCI transmitter component 140, TX processor 368, the RX processor 356, or the controller/processor 359). The method 1500 may be performed by the UCI transmitter component 140 in communication with the UCI receiver component 120 of the base station 102.

At block 1510, the method 1500 may optionally include receiving signaling indicating the oversampling factor, the codebook, and a codebook index for the UE. In an aspect, for example, the UE 104, the RX processor 356 and/or the controller/processor 359 may execute the UCI transmitter component 140 and/or the configuration component 142 to receive signaling indicating the oversampling factor, the codebook, and a codebook index for the UE. Accordingly, the UE 104, the RX processor 356, and/or the controller/processor 359 executing the UCI transmitter component 140 and/or the configuration component 142 may provide means for receiving signaling indicating the oversampling factor, the codebook, and a codebook index for the UE.

At block 1520, the method 1500 may include identifying a DFT matrix including a number of rows and columns for scheduled PUCCH resources based on at least an oversampling factor and the scheduled PUCCH resources. In an aspect, for example, the UE 104, the TX processor 368 and/or the controller/processor 359 may execute the UCI transmitter component 140 and/or the DFT matrix generator 144 to identify a DFT matrix 1000 including a number of rows and columns for scheduled PUCCH resources based on at least an oversampling factor and the scheduled PUCCH resources. In an aspect, the DFT matrix 1000 is an ON×ON matrix, where O is the oversampling factor and N is based on at least a number of symbols in a time domain of the scheduled PUCCH resources. In an aspect, in sub-block 1522, the block 1520 may include identifying a separate DFT matrix for each hop of a frequency hopping pattern. For example, when the PUCCH resources have a frequency hopping pattern, the sub-block 1522 may be performed. Accordingly, the UE 104, the TX processor 368, and/or the controller/processor 359 executing the UCI transmitter component 140 and/or the DFT matrix generator 144 may provide means for identifying a DFT matrix including a number of rows and columns for scheduled PUCCH resources based on at least an oversampling factor and the scheduled PUCCH resources.

At block 1530, the method 1500 may optionally include determining a Kronecker product between the DFT matrix and a cell specific sequence. In an aspect, for example, the UE 104, the TX processor 368 and/or the controller/processor 359 may execute the UCI transmitter component 140 and/or the codepoint component 146 to determine a Kronecker product between the DFT matrix 900 and a cell specific sequence 700. Accordingly, the UE 104, the TX processor 368, and/or the controller/processor 359 executing the UCI transmitter component 140 and/or the codepoint component 146 may provide means for determining a Kronecker product between the DFT matrix and a cell specific sequence.

At block 1540, the method 1500 may include selecting a codepoint from a sequence pool derived from the DFT matrix based on a payload value of UCI to be transmitted on the PUCCH resources. In an aspect, for example, the UE 104, the TX processor 368 and/or the controller/processor 359 may execute the UCI transmitter component 140 and/or the codepoint component 146 select a codepoint from a sequence pool derived from the DFT matrix based on a payload value of UCI to be transmitted on the PUCCH resources. For example, when the block 1530 is performed, the codepoint may be selected from the sequence pool of a resulting matrix of the Kronecker product. In an aspect, at sub-block 1542, the block 1540 may include selecting an ON×N sub-matrix of the ON×ON matrix based on the codebook. For example, the codepoint component 146 may select the ON×N sub-matrix based on the columns identified by the codebook indication 1126. Accordingly, the UE 104, the TX processor 368, and/or the controller/processor 359 executing the UCI transmitter component 140 and/or the configuration component 142 may provide means for selecting a codepoint from a sequence pool derived from the DFT matrix based on a payload value of UCI to be transmitted on the PUCCH resources.

At block 1550, the method 1500 may include transmitting the selected codepoint on the scheduled PUCCH resources. In an aspect, for example, the UE 104, the TX processor 368 and/or the controller/processor 359 may execute the UCI transmitter component 140 and/or the mapping component 148 to transmit the selected codepoint on the scheduled PUCCH resources 1122. In an aspect, at sub-block 1552, the block 1450 may include rate matching around a DMRS or puncturing the PUCCH transmission of the selected codepoint with the DMRS. Accordingly, the UE 104, the TX processor 368, and/or the controller/processor 359 executing the UCI transmitter component 140 and/or the configuration component 142 may provide means for transmitting the selected codepoint on the scheduled PUCCH resources.

Figure 16:
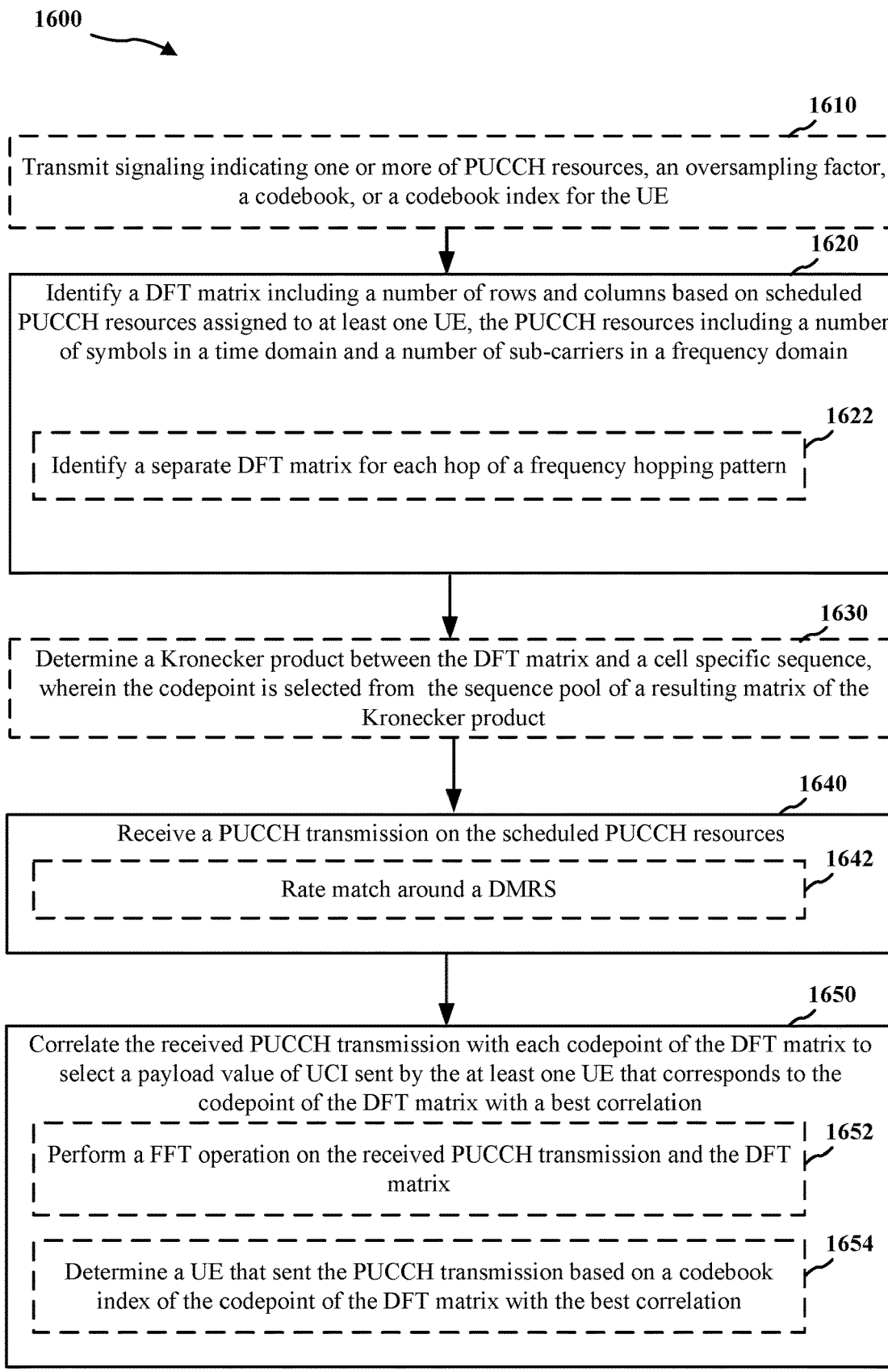
FIG. 16 is a flowchart of an example of a method of PUCCH transmission based on a DFT matrix for a base station.

FIG. 16 is a flowchart of an example of a method 1600 of wireless communication for a base station to receive a UCI based on a DFT matrix. The method 1600 may be performed by a base station (such as the base station 102, which may include the memory 376 and which may be the entire base station 102 or a component of the base station 102 such as the UCI receiver component 120, TX processor 316, the RX processor 370, or the controller/processor 375). The method 1600 may be performed by the UCI receiver component 120 in communication with the UCI transmitter component 140 of the UE 104.

At block 1610, the method 1600 may optionally include transmitting signaling indicating one or more of PUCCH resources, an oversampling factor, a codebook, or a codebook index for the UE. In an aspect, for example, the base station 102, the controller/processor 375, and/or the TX processor 316 may execute the UCI receiver component 120 and/or the configuration component 1110 to transmit signaling 1120 indicating one or more of PUCCH resources 1122, an oversampling factor 1124, a codebook indication 1126, or a codebook index 1128 for the UE. Accordingly, the base station 102, the controller/processor 375, and/or the TX processor 316 executing the UCI receiver component 120 and/or the configuration component 1110 may provide means for transmitting signaling indicating one or more of PUCCH resources, an oversampling factor, a codebook, or a codebook index for the UE.

At block 1620, the method 1600 may include identifying a DFT matrix including a number of rows and columns based on scheduled PUCCH resources assigned to at least one UE. In an aspect, for example, the base station 102, the controller/processor 375, and/or the RX processor 370 may execute the UCI receiver component 120 and/or the DFT matrix generator 122 to identify a DFT matrix including a number of rows and columns based on scheduled PUCCH resources assigned to at least one UE. The PUCCH resources 1122 may include a number of symbols (N) in a time domain and a number of sub-carriers (M) in a frequency domain. In some implementations, the DFT matrix 900 is a MN×MN matrix, where N is the number of symbols and M is the number of sub-carriers. In an aspect where the PUCCH resources 1122 have a frequency hopping pattern, at sub-block 1622, the block 1620 may optionally include identifying a separate DFT matrix for each hop of the frequency hopping pattern. Accordingly, the base station 102, the controller/processor 375, and/or the RX processor 370 executing the UCI receiver component 120 and/or the DFT matrix generator 122 may provide means for identifying a DFT matrix including a number of rows and columns based on scheduled PUCCH resources assigned to at least one UE.

At block 1630, the method 1600 may optionally include determining a Kronecker product between the DFT matrix and a cell specific sequence. In an aspect, for example, the base station 102, the controller/processor 375, and/or the RX processor 370 may execute the UCI receiver component 120 and/or the DFT matrix generator 122 to determine a Kronecker product between the DFT matrix 900 and the cell specific sequence 700. The codebook may be drawn from the resulting matrix of the Kronecker product. Accordingly, the base station 102, the controller/processor 375, and/or the RX processor 370 executing the UCI receiver component 120 and/or the DFT matrix generator 122 may provide means for determining a Kronecker product between the DFT matrix and a cell specific sequence.

At block 1640, the method 1600 may include receiving a PUCCH transmission on the scheduled PUCCH resources. In an aspect, for example, the base station 102, the controller/processor 375, and/or the RX processor 370 may execute the UCI receiver component 120 and/or the PUCCH receiver 124 to receive a PUCCH transmission 1130 on the scheduled PUCCH resources 1122. In an aspect, at sub-block 1642, the block 1640 may include rate matching around a DMRS. For example, the OFDM symbols carrying the DMRS 1220 may be removed from the PUCCH transmission. Accordingly, the base station 102, the controller/processor 375, and/or the RX processor 370 executing the UCI receiver component 120 and/or the PUCCH receiver 124 may provide means for receiving a PUCCH transmission on the scheduled PUCCH resources.

At block 1650, the method 1600 includes correlating the received PUCCH transmission with each codepoint of the DFT matrix to select a payload value of UCI sent by the at least one UE that corresponds to the codepoint of the DFT matrix with a best correlation. In an aspect, for example, the base station 102, the controller/processor 375, and/or the RX processor 370 may execute the UCI receiver component 120 and/or the correlation component 128 to correlate the received PUCCH transmission 1130 with each codepoint of the DFT matrix 900 to select a payload value of UCI sent by the at least one UE that corresponds to the codepoint of the DFT matrix with a best correlation. In an aspect, at sub-block 1652, the block 1650 may include performing a FFT operation on the received PUCCH transmission and the DFT matrix. In an aspect, at sub-block 1654, the block 1650 may include determining a UE that sent the PUCCH transmission based on a codebook index of the codepoint of the DFT matrix with the best correlation. Accordingly, the base station 102, the controller/processor 375, and/or the RX processor 370 executing the UCI receiver component 120 and/or the correlation component 126 may provide means for correlating the received PUCCH transmission with each codepoint of the DFT matrix to select a payload value of UCI sent by the at least one UE that corresponds to the codepoint of the DFT matrix with a best correlation.

Figure 17:
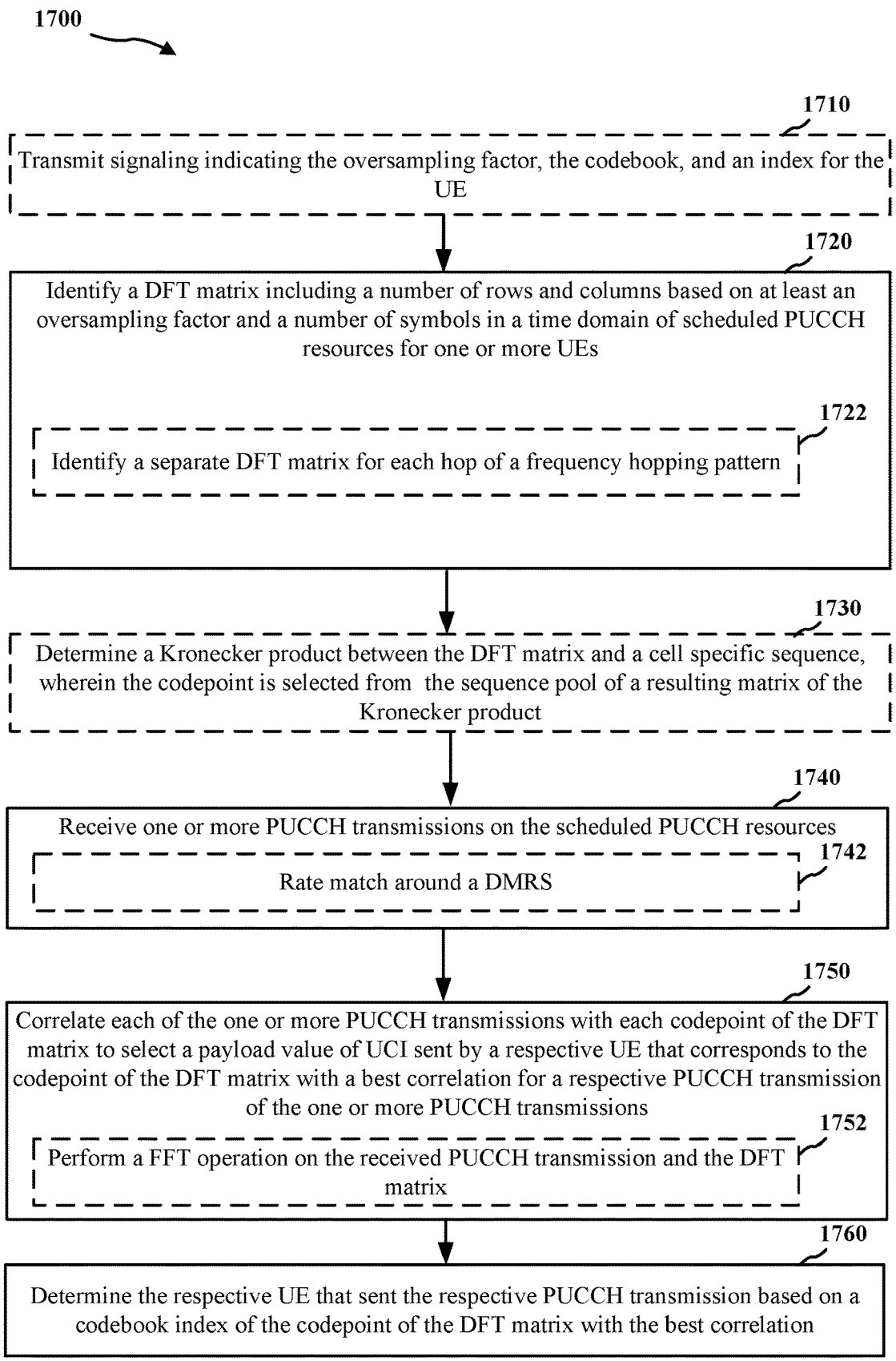
FIG. 17 is a flowchart of an example of a method of PUCCH transmission based on an oversampled DFT matrix for a base station.

FIG. 17 is a flowchart of an example of a method 1700 of wireless communication for a base station to receive a UCI based on a DFT matrix. The method 1700 may be performed by a base station (such as the base station 102, which may include the memory 376 and which may be the entire base station 102 or a component of the base station 102 such as the UCI receiver component 120, TX processor 316, the RX processor 370, or the controller/processor 375). The method 1700 may be performed by the UCI receiver component 120 in communication with the UCI transmitter component 140 of the UE 104.

At block 1710, the method 1700 may optionally include transmitting signaling indicating an oversampling factor, a codebook, and an index for the UE. In an aspect, for example, the base station 102, the controller/processor 375, and/or the TX processor 316 may execute the UCI receiver component 120 and/or the configuration component 1110 to transmit signaling 1120 indicating an oversampling factor 1124, a codebook indication 1126, and a codebook index 1128 for the UE. Accordingly, the base station 102, the controller/processor 375, and/or the TX processor 316 executing the UCI receiver component 120 and/or the configuration component 1110 may provide means for transmitting signaling indicating the oversampling factor, the codebook, and an index for the UE.

At block 1720, the method 1700 may include identifying a DFT matrix including a number of rows and columns based on at least an oversampling factor and a number of symbols in a time domain of scheduled PUCCH resources for one or more UEs. In an aspect, for example, the base station 102, the controller/processor 375, and/or the RX processor 370 may execute the UCI receiver component 120 and/or the DFT matrix generator 122 to identify a DFT matrix including a number of rows and columns based on at least an oversampling factor and a number of symbols in a time domain of scheduled PUCCH resources for one or more UEs. In some implementations, the DFT matrix 900 is a MN×MN matrix, where N is the number of symbols and M is the number of sub-carriers. In an aspect where the PUCCH resources 1122 have a frequency hopping pattern, at sub-block 1722, the block 1720 may optionally include identifying a separate DFT matrix for each hop of the frequency hopping pattern. Accordingly, the base station 102, the controller/processor 375, and/or the RX processor 370 executing the UCI receiver component 120 and/or the DFT matrix generator 122 may provide means for identifying a DFT matrix including a number of rows and columns based on at least an oversampling factor and a number of symbols in a time domain of scheduled PUCCH resources for one or more UEs.

At block 1730, the method 1700 may optionally include determining a Kronecker product between the DFT matrix and a cell specific sequence. In an aspect, for example, the base station 102, the controller/processor 375, and/or the RX processor 370 may execute the UCI receiver component 120 and/or the DFT matrix generator 122 to determine a Kronecker product between the DFT matrix 900 and the cell specific sequence 700. The codebook may be drawn from the resulting matrix of the Kronecker product. Accordingly, the base station 102, the controller/processor 375, and/or the RX processor 370 executing the UCI receiver component 120 and/or the DFT matrix generator 122 may provide means for determining a Kronecker product between the DFT matrix and a cell specific sequence.

At block 1740, the method 1700 may include receiving one or more PUCCH transmissions on the scheduled PUCCH resources. In an aspect, for example, the base station 102, the controller/processor 375, and/or the TX processor 316 may execute the UCI receiver component 120 and/or the PUCCH receiver 124 to receive one or more PUCCH transmissions 1130 on the scheduled PUCCH resources 1122. In an aspect, at sub-block 1742, the block 1740 may include rate matching around a DMRS. For example, the OFDM symbols carrying the DMRS 1220 may be removed from the PUCCH transmission. Accordingly, the base station 102, the controller/processor 375, and/or the RX processor 370 executing the UCI receiver component 120 and/or the PUCCH receiver 124 may provide means for receiving one or more PUCCH transmissions on the scheduled PUCCH resources.

At block 1750, the method 1700 includes correlating each of the one or more PUCCH transmissions with each codepoint of the DFT matrix to select a payload value of UCI sent by a respective UE that corresponds to the codepoint of the DFT matrix with a best correlation for a respective PUCCH transmission of the one or more PUCCH transmissions. In an aspect, for example, the base station 102, the controller/processor 375, and/or the RX processor 370 may execute the UCI receiver component 120 and/or the correlation component 128 to correlate each of the one or more PUCCH transmissions with each codepoint of the DFT matrix 1000 to select a payload value of UCI 1210 sent by a respective UE that corresponds to the codepoint of the DFT matrix with a best correlation for a respective PUCCH transmission of the one or more PUCCH transmissions. In an aspect, at sub-block 1752, the block 1750 may include performing a FFT operation on the received PUCCH transmission and the DFT matrix. Accordingly, the base station 102, the controller/processor 375, and/or the RX processor 370 executing the UCI receiver component 120 and/or the correlation component 126 may provide means for correlating the received PUCCH transmission with each codepoint of the DFT matrix to select a payload value of UCI sent by the at least one UE that corresponds to the codepoint of the DFT matrix with a best correlation.

At block 1760, the method 1700 includes determining the respective UE that sent the respective PUCCH transmission based on a codebook index of the codepoint of the DFT matrix with the best correlation. In an aspect, for example, the base station 102, the controller/processor 375, and/or the RX processor 370 may execute the UCI receiver component 120 and/or the correlation component 128 to determine the respective UE that sent the respective PUCCH transmission based on a codebook index of the codepoint of the DFT matrix with the best correlation. Accordingly, the base station 102, the controller/processor 375, and/or the RX processor 370 executing the UCI receiver component 120 and/or the correlation component 126 may provide means for determining the respective UE that sent the respective PUCCH transmission based on a codebook index of the codepoint of the DFT matrix with the best correlation.

SOME FURTHER EXAMPLE CLAUSES

Implementation examples are described in the following numbered clauses:

1. A method of wireless communication, comprising, at a user equipment (UE):
  identifying a discrete Fourier transform (DFT) matrix including a number of rows and columns based on scheduled physical uplink control channel (PUCCH) resources including a number of symbols in a time domain and a number of sub-carriers in a frequency domain;
  selecting a codepoint from a sequence pool derived from the DFT matrix based on a payload value of uplink control information (UCI) to be transmitted on the PUCCH resources; and
  transmitting the selected codepoint on the scheduled PUCCH resources.

2. The method of clause 1, wherein identifying the DFT matrix based on the scheduled PUCCH resources comprises identifying a separate DFT matrix for each hop of a frequency hopping pattern.

3. The method of clause 1 or 2, wherein transmitting the selected codepoint on the scheduled PUCCH resources comprises rate matching around a demodulation reference signal (DMRS) or puncturing the transmission of the selected codepoint with the DMRS.

4. The method of any of clauses 1-3, further comprising determining a Kronecker product between the DFT matrix and a cell specific sequence, wherein the codepoint is selected from the sequence pool of a resulting matrix of the Kronecker product.

5. The method of any of clauses 1-4, wherein the DFT matrix is a MN×MN matrix, where N is the number of symbols and M is the number of sub-carriers.

6. The method of any of clauses 1-5, wherein selecting the codepoint from the DFT matrix comprises oversampling the DFT matrix based on a codebook index assigned to the UE.

7. The method of any of clauses 1-6, further comprising receiving signaling indicating one or more of the PUCCH resources, an oversampling factor, a codebook, or a codebook index for the UE.

8. A method of wireless communication, comprising, at a user equipment (UE):
  identifying a discrete Fourier transform (DFT) matrix including a number of rows and columns for scheduled physical uplink control channel (PUCCH) resources based on at least an oversampling factor and the scheduled PUCCH resources;
  selecting a codepoint from a sequence pool derived from the DFT matrix based on a codebook assigned to the UE and a payload value of uplink control information (UCI); and
  transmitting the selected codepoint on the scheduled PUCCH resources.

9. The method of clause 8, wherein the DFT matrix is an ON×ON matrix, where O is the oversampling factor and N is based on at least a number of symbols in a time domain of the scheduled PUCCH resources.

10. The method of clause 9, wherein selecting a codepoint from the DFT matrix based on a codebook assigned to the UE comprises selecting an ON×N sub-matrix of the ON×ON matrix based on the codebook.

11. The method of clause 9, wherein N is a product of the number of symbols in a time domain of the scheduled PUCCH resources and a number of sub-carriers in a frequency domain of the scheduled PUCCH resources.

12. The method of any of clauses 8-11, further comprising receiving signaling indicating the oversampling factor, the codebook, and a codebook index for the UE.

13. The method of clause 12, wherein the signaling is one of a radio resource control (RRC) message, a media access control-control element (MAC-CE), or a downlink control information (DCI).

14. The method of any of clauses 8-13, wherein the codebook comprises rows of the DFT matrix selected based on the oversampling factor.

15. The method of any of clauses 8-15, further comprising determining a Kronecker product between the DFT matrix and a cell specific sequence, wherein the codepoint is selected from the sequence pool of a resulting matrix of the Kronecker product.

16. A method of wireless communication for a base station, comprising:
   identifying a discrete Fourier transform (DFT) matrix including a number of rows and columns based on scheduled physical uplink control channel (PUCCH) resources assigned to at least one user equipment (UE), the PUCCH resources including a number of symbols in a time domain and a number of sub-carriers in a frequency domain;
   receiving a PUCCH transmission on the scheduled PUCCH resources; and
   correlating the received PUCCH transmission with each codepoint of the DFT matrix to select a payload value of uplink control information (UCI) sent by the at least one UE that corresponds to the codepoint of the DFT matrix with a best correlation.

17. The method of clause 16, wherein the correlating comprises performing a fast Fourier transform (FFT) operation on the received PUCCH transmission and the DFT matrix.

18. The method of clause 16 or 17, wherein identifying the DFT matrix based on the scheduled PUCCH resources comprises identifying a separate DFT matrix for each hop of a frequency hopping pattern.

19. The method of any of clauses 16-18, wherein correlating the received PUCCH transmission comprises rate matching around a demodulation reference signal (DMRS).

20. The method of any of clauses 16-19, further comprising determining a Kronecker product between the DFT matrix and a cell specific sequence, wherein each codepoint is selected from a sequence pool of a resulting matrix of the Kronecker product.

21. The method of any of clauses 16-20, wherein the DFT matrix is a MN×MN matrix, where N is the number of symbols and M is the number of sub-carriers.

22. The method of any of clauses 16-21, wherein correlating the received PUCCH transmission with each codepoint of the DFT matrix comprises determining a UE that sent the PUCCH transmission based on a codebook index of the codepoint of the DFT matrix with the best correlation.

23. The method of any of clauses 16-22, further comprising transmitting signaling indicating one or more of PUCCH resources, an oversampling factor, a codebook, or a codebook index for the at least one UE.

24. A method of wireless communication for a base station, comprising:
   identifying a discrete Fourier transform (DFT) matrix including a number of rows and columns based on at least an oversampling factor and a number of symbols in a time domain of scheduled physical uplink control channel (PUCCH) resources for one or more user equipment (UEs);
   receiving one or more PUCCH transmissions on the scheduled PUCCH resources;
   correlating each of the one or more PUCCH transmissions with each codepoint of the DFT matrix to select a payload value of uplink control information (UCI) sent by a respective UE that corresponds to the codepoint of the DFT matrix with a best correlation for a respective PUCCH transmission of the one or more PUCCH transmissions; and
   determining the respective UE that sent the respective PUCCH transmission based on a codebook index of the codepoint of the DFT matrix with the best correlation.

25. The method of clause 24, wherein the DFT matrix is based on an ON×ON matrix, where O is the oversampling factor and N is the number of symbols.

26. The method of clause 25, wherein identifying the DFT matrix further comprises selecting an ON×N sub-matrix of the ON×ON matrix as the DFT matrix.

27. The method of any of clauses 24-26, further comprising transmitting signaling indicating the oversampling factor, the codebook, and an index for the UE.

28. The method of clause 27, wherein the signaling is one of a radio resource control (RRC) message, a media access control-control element (MAC-CE), or a downlink control information (DCI).

29. The method of any of clauses 24-28, further comprising determining a Kronecker product between the DFT matrix and a cell specific sequence, wherein each codepoint is selected from a sequence pool of a resulting matrix of the Kronecker product.

30. An apparatus for wireless communication for a user equipment (UE), comprising:
   a memory storing computer-executable instructions; and
   at least one processor coupled to the memory and configured to execute the computer-executable instructions to:
      identify a discrete Fourier transform (DFT) matrix including a number of rows and columns based on scheduled physical uplink control channel (PUCCH) resources including a number of symbols in a time domain and a number of sub-carriers in a frequency domain;
      select a codepoint from a sequence pool derived from the DFT matrix based on a payload value of uplink control information (UCI) to be transmitted on the PUCCH resources; and
      transmit the selected codepoint on the scheduled PUCCH resources.

31. The apparatus of clause 30, wherein the at least one processor is configured to identify a separate DFT matrix for each hop of a frequency hopping pattern.

32. The apparatus of clause 30 or 31, wherein the at least one processor is configured to rate match around a demodulation reference signal (DMRS) or puncture the transmission of the selected codepoint with the DMRS.

33. The apparatus of any of clauses 30-32, wherein the at least one processor is configured to determine a Kronecker product between the DFT matrix and a cell specific sequence, wherein the codepoint is selected from the sequence pool of a resulting matrix of the Kronecker product.

34. The apparatus of any of clauses 30-33, wherein the DFT matrix is a MN×MN matrix, where N is the number of symbols and M is the number of sub-carriers.

35. The apparatus of any of clauses 30-34, wherein the at least one processor is configured to oversample the DFT matrix based on a codebook index assigned to the UE.

36. The apparatus of any of clauses 30-35, wherein the at least one processor is configured to receive signaling indicating one or more of the PUCCH resources, an oversampling factor, a codebook, or a codebook index for the UE.

37. An apparatus for wireless communication for a user equipment (UE), comprising:
   a memory storing computer-executable instructions; and
   at least one processor coupled to the memory and configured to execute the computer-executable instructions to:
      identify a discrete Fourier transform (DFT) matrix including a number of rows and columns for scheduled physical uplink control channel (PUCCH) resources based on at least an oversampling factor and the scheduled PUCCH resources;

select a codepoint from a sequence pool derived from the DFT matrix based on a codebook assigned to the UE and a payload value of uplink control information (UCI); and transmitting the selected codepoint on the scheduled PUCCH resources.

38. The apparatus of clause 37, wherein the DFT matrix is an ON×ON matrix, where O is the oversampling factor and N is based on at least a number of symbols in a time domain of the scheduled PUCCH resources.

39. The apparatus of clause 38, wherein the at least one processor is configured to select an ON×N sub-matrix of the ON×ON matrix based on the codebook.

40. The apparatus of clause 38, wherein N is a product of the number of symbols in a time domain of the scheduled PUCCH resources and a number of sub-carriers in a frequency domain of the scheduled PUCCH resources.

41. The apparatus of any of clauses 37-40, wherein the at least one processor is configured to receive signaling indicating the oversampling factor, the codebook, and a codebook index for the UE.

42. The apparatus of clause 41, wherein the signaling is one of a radio resource control (RRC) message, a media access control-control element (MAC-CE), or a downlink control information (DCI).

43. The apparatus of any of clauses 37-42, wherein the codebook comprises rows of the DFT matrix selected based on the oversampling factor.

44. The apparatus of any of clauses 37-43, wherein the at least one processor is configured to determine a Kronecker product between the DFT matrix and a cell specific sequence, wherein the codepoint is selected from the sequence pool of a resulting matrix of the Kronecker product.

45. An apparatus for wireless communication for a base station, comprising:

a memory storing computer-executable instructions; and
at least one processor coupled to the memory and configured to execute the computer-executable instructions to:
identify a discrete Fourier transform (DFT) matrix including a number of rows and columns based on scheduled physical uplink control channel (PUCCH) resources assigned to at least one user equipment (UE), the PUCCH resources including a number of symbols in a time domain and a number of sub-carriers in a frequency domain;
receive a PUCCH transmission on the scheduled PUCCH resources; and
correlate the received PUCCH transmission with each codepoint of the DFT matrix to select a payload value of uplink control information (UCI) sent by the at least one UE that corresponds to the codepoint of the DFT matrix with a best correlation.

46. The apparatus of clause 45, wherein the at least one processor is configured to perform a fast Fourier transform (FFT) operation on the received PUCCH transmission and the DFT matrix.

47. The apparatus of clause 45 or 46, wherein the at least one processor is configured to identify a separate DFT matrix for each hop of a frequency hopping pattern.

48. The apparatus of any of clauses 45-47, wherein the at least one processor is configured to rate match around a demodulation reference signal (DMRS).

49. The apparatus of any of clauses 45-48, wherein the at least one processor is configured to determine a Kronecker product between the DFT matrix and a cell specific sequence, wherein each codepoint is selected from a sequence pool of a resulting matrix of the Kronecker product.

50. The apparatus of any of clauses 45-49, wherein the DFT matrix is a MN×MN matrix, where N is the number of symbols and M is the number of sub-carriers.

51. The apparatus of any of clauses 45-50, wherein the at least one processor is configured to determine a UE that sent the PUCCH transmission based on a codebook index of the codepoint of the DFT matrix with the best correlation.

52. The apparatus of any of clauses 45-51, wherein the at least one processor is configured to transmit signaling indicating one or more of PUCCH resources, an oversampling factor, a codebook, or a codebook index for the at least one UE.

53. An apparatus for wireless communication for a base station, comprising:

a memory storing computer-executable instructions; and
at least one processor coupled to the memory and configured to execute the computer-executable instructions to:
identify a discrete Fourier transform (DFT) matrix including a number of rows and columns based on at least an oversampling factor and a number of symbols in a time domain of scheduled physical uplink control channel (PUCCH) resources for one or more user equipment (UEs);
receive one or more PUCCH transmissions on the scheduled PUCCH resources;
correlate each of the one or more PUCCH transmissions with each codepoint of the DFT matrix to select a payload value of uplink control information (UCI) sent by a respective UE that corresponds to the codepoint of the DFT matrix with a best correlation for a respective PUCCH transmission of the one or more PUCCH transmissions; and
determine the respective UE that sent the respective PUCCH transmission based on a codebook index of the codepoint of the DFT matrix with the best correlation.

54. The apparatus of clause 53, wherein the DFT matrix is based on an ON×ON matrix, where O is the oversampling factor and N is the number of symbols.

55. The apparatus of clause 54, wherein the at least one processor is configured to select an ON×N sub-matrix of the ON×ON matrix as the DFT matrix.

56. The apparatus of any of clauses 53-55, wherein the at least one processor is configured to transmit signaling indicating the oversampling factor, the codebook, and an index for the UE.

57. The apparatus of clause 56, wherein the signaling is one of a radio resource control (RRC) message, a media access control-control element (MAC-CE), or a downlink control information (DCI).

58. The apparatus of any of clauses 53-57, wherein the at least one processor is configured to determine a Kronecker product between the DFT matrix and a cell specific sequence, wherein each codepoint is selected from a sequence pool of a resulting matrix of the Kronecker product.

59. An apparatus for wireless communication for a user equipment (UE), comprising:

means for identifying a discrete Fourier transform (DFT) matrix including a number of rows and columns based on scheduled physical uplink control channel (PUCCH) resources including a number of symbols in a time domain and a number of sub-carriers in a frequency domain;
  means for selecting a codepoint from a sequence pool derived from the DFT matrix based on a payload value of uplink control information (UCI) to be transmitted on the PUCCH resources; and
  means for transmitting the selected codepoint on the scheduled PUCCH resources.

60. The apparatus of clause 59, wherein the means for identifying the DFT matrix based on the scheduled PUCCH resources is configured to identify a separate DFT matrix for each hop of a frequency hopping pattern.

61. The apparatus of clause 59 or 60, wherein the means for transmitting the selected codepoint on the scheduled PUCCH resources is configured to rate match around a demodulation reference signal (DMRS) or puncture the transmission of the selected codepoint with the DMRS.

62. The apparatus of any of clauses 59-61, wherein the means for selecting is configured to determine a Kronecker product between the DFT matrix and a cell specific sequence, wherein the codepoint is selected from the sequence pool of a resulting matrix of the Kronecker product.

63. The apparatus of any of clauses 59-62, wherein the DFT matrix is a MN×MN matrix, where N is the number of symbols and M is the number of sub-carriers.

64. The apparatus of any of clauses 59-63, wherein the means for selecting the codepoint from the DFT matrix is configured to oversample the DFT matrix based on a codebook index assigned to the UE.

65. The apparatus of any of clauses 59-64, further comprising means for receiving signaling indicating one or more of the PUCCH resources, an oversampling factor, a codebook, or a codebook index for the UE.

66. An apparatus for wireless communication for a user equipment (UE), comprising:
  means for identifying a discrete Fourier transform (DFT) matrix including a number of rows and columns for scheduled physical uplink control channel (PUCCH) resources based on at least an oversampling factor and the scheduled PUCCH resources;
  means for selecting a codepoint from a sequence pool derived from the DFT matrix based on a codebook assigned to the UE and a payload value of uplink control information (UCI); and
  means for transmitting the selected codepoint on the scheduled PUCCH resources.

67. The apparatus of clause 66, wherein the DFT matrix is an ON×ON matrix, where O is the oversampling factor and N is based on at least a number of symbols in a time domain of the scheduled PUCCH resources.

68. The apparatus of clause 67, wherein the means for selecting a codepoint from the DFT matrix based on a codebook assigned to the UE is configured to select an ON×N sub-matrix of the ON×ON matrix based on the codebook.

69. The apparatus of clause 67, wherein N is a product of the number of symbols in a time domain of the scheduled PUCCH resources and a number of sub-carriers in a frequency domain of the scheduled PUCCH resources.

70. The apparatus of any of clauses 66-69, further comprising means for receiving signaling indicating the oversampling factor, the codebook, and a codebook index for the UE.

71. The apparatus of clause 70, wherein the signaling is one of a radio resource control (RRC) message, a media access control-control element (MAC-CE), or a downlink control information (DCI).

72. The apparatus of any of clauses 66-71, wherein the codebook comprises rows of the DFT matrix selected based on the oversampling factor.

73. The apparatus of any of clauses 66-72, wherein the means for selecting is configured to determine a Kronecker product between the DFT matrix and a cell specific sequence, wherein the codepoint is selected from the sequence pool of a resulting matrix of the Kronecker product.

74. An apparatus for wireless communication for a base station, comprising:
  means for identifying a discrete Fourier transform (DFT) matrix including a number of rows and columns based on scheduled physical uplink control channel (PUCCH) resources assigned to at least one user equipment (UE), the PUCCH resources including a number of symbols in a time domain and a number of sub-carriers in a frequency domain;
  means for receiving a PUCCH transmission on the scheduled PUCCH resources; and
  means for correlating the received PUCCH transmission with each codepoint of the DFT matrix to select a payload value of uplink control information (UCI) sent by the at least one UE that corresponds to the codepoint of the DFT matrix with a best correlation.

75. The apparatus of clause 74, wherein the means for correlating is configured to perform a fast Fourier transform (FFT) operation on the received PUCCH transmission and the DFT matrix.

76. The apparatus of clause 74 or 75, wherein the means for identifying the DFT matrix based on the scheduled PUCCH resources is configured to identify a separate DFT matrix for each hop of a frequency hopping pattern.

77. The apparatus of any of clauses 74-76, wherein the means for correlating the received PUCCH transmission is configured to rate match around a demodulation reference signal (DMRS).

78. The apparatus of any of clauses 74-77, the means for identifying is configured to determine a Kronecker product between the DFT matrix and a cell specific sequence, wherein each codepoint is selected from a sequence pool of a resulting matrix of the Kronecker product.

79. The apparatus of any of clauses 74-78, wherein the DFT matrix is a MN×MN matrix, where N is the number of symbols and M is the number of sub-carriers.

80. The apparatus of any of clauses 74-79, wherein the means for correlating the received PUCCH transmission with each codepoint of the DFT matrix is configured to determine a UE that sent the PUCCH transmission based on a codebook index of the codepoint of the DFT matrix with the best correlation.

81. The apparatus of any of clauses 74-80, further comprising means for transmitting signaling indicating one or more of PUCCH resources, an oversampling factor, a codebook, or a codebook index for the at least one UE.

82. An apparatus for wireless communication for a base station, comprising:
  means for identifying a discrete Fourier transform (DFT) matrix including a number of rows and columns based on at least an oversampling factor and a number of symbols in a time domain of scheduled physical uplink control channel (PUCCH) resources for one or more user equipment (UEs);

means for receiving one or more PUCCH transmissions on the scheduled PUCCH resources;

means for correlating each of the one or more PUCCH transmissions with each codepoint of the DFT matrix to select a payload value of uplink control information (UCI) sent by a respective UE that corresponds to the codepoint of the DFT matrix with a best correlation for a respective PUCCH transmission of the one or more PUCCH transmissions; and means for determining the respective UE that sent the respective PUCCH transmission based on a codebook index of the codepoint of the DFT matrix with the best correlation.

83. The apparatus of clause 82, wherein the DFT matrix is based on an ON×ON matrix, where O is the oversampling factor and N is the number of symbols.

84. The apparatus of clause 83, wherein the means for identifying the DFT matrix is configured to select an ON×N sub-matrix of the ON×ON matrix as the DFT matrix.

85. The apparatus of any of clauses 82-84, further comprising means for transmitting signaling indicating the oversampling factor, the codebook, and an index for the UE.

86. The apparatus of clause 85, wherein the signaling is one of a radio resource control (RRC) message, a media access control-control element (MAC-CE), or a downlink control information (DCI).

87. The apparatus of any of clauses 82-86, wherein the means for identifying is configured to determine a Kronecker product between the DFT matrix and a cell specific sequence, wherein each codepoint is selected from a sequence pool of a resulting matrix of the Kronecker product.

88. A non-transitory computer-readable medium storing computer executable code, the code when executed by a processor of a user equipment (UE) causes the processor to:
identify a discrete Fourier transform (DFT) matrix including a number of rows and columns based on scheduled physical uplink control channel (PUCCH) resources including a number of symbols in a time domain and a number of sub-carriers in a frequency domain;
select a codepoint from a sequence pool derived from the DFT matrix based on a payload value of uplink control information (UCI) to be transmitted on the PUCCH resources; and
transmit the selected codepoint on the scheduled PUCCH resources.

89. The non-transitory computer-readable medium of clause 88, wherein the code to identify the DFT matrix based on the scheduled PUCCH resources comprises code to identify a separate DFT matrix for each hop of a frequency hopping pattern.

90. The non-transitory computer-readable medium of clause 88 or 89, wherein the code to transmit the selected codepoint on the scheduled PUCCH resources comprises code to rate match around a demodulation reference signal (DMRS) or code to puncture the transmission of the selected codepoint with the DMRS.

91. The non-transitory computer-readable medium of any of clauses 88-90, further comprising code to determine a Kronecker product between the DFT matrix and a cell specific sequence, wherein the codepoint is selected from the sequence pool of a resulting matrix of the Kronecker product.

92. The non-transitory computer-readable medium of any of clauses 88-91, wherein the DFT matrix is a MN×MN matrix, where N is the number of symbols and M is the number of sub-carriers.

93. The non-transitory computer-readable medium of any of clauses 88-92, wherein the code to select the codepoint from the DFT matrix comprises code to oversample the DFT matrix based on a codebook index assigned to the UE.

94. The non-transitory computer-readable medium of any of clauses 88-93, further comprising code to receive signaling indicating one or more of the PUCCH resources, an oversampling factor, a codebook, or a codebook index for the UE.

95. A non-transitory computer-readable medium storing computer executable code, the code when executed by a processor of a user equipment (UE) causes the processor to:
identify a discrete Fourier transform (DFT) matrix including a number of rows and columns for scheduled physical uplink control channel (PUCCH) resources based on at least an oversampling factor and the scheduled PUCCH resources;
select a codepoint from a sequence pool derived from the DFT matrix based on a codebook assigned to the UE and a payload value of uplink control information (UCI); and
transmit the selected codepoint on the scheduled PUCCH resources.

96. The non-transitory computer-readable medium of clause 95, wherein the DFT matrix is an ON×ON matrix, where O is the oversampling factor and N is based on at least a number of symbols in a time domain of the scheduled PUCCH resources.

97. The non-transitory computer-readable medium of clause 96, wherein the code to select a codepoint from the DFT matrix based on a codebook assigned to the UE comprises code to select an ON×N sub-matrix of the ON×ON matrix based on the codebook.

98. The non-transitory computer-readable medium of clause 96, wherein N is a product of the number of symbols in a time domain of the scheduled PUCCH resources and a number of sub-carriers in a frequency domain of the scheduled PUCCH resources.

99. The non-transitory computer-readable medium of any of clauses 95-98, further comprising code to receive signaling indicating the oversampling factor, the codebook, and a codebook index for the UE.

100. The non-transitory computer-readable medium of clause 99, wherein the signaling is one of a radio resource control (RRC) message, a media access control-control element (MAC-CE), or a downlink control information (DCI).

101. The non-transitory computer-readable medium of any of clauses 95-100, wherein the codebook comprises rows of the DFT matrix selected based on the oversampling factor.

102. The non-transitory computer-readable medium of any of clauses 95-101, further comprising code to determine a Kronecker product between the DFT matrix and a cell specific sequence, wherein the codepoint is selected from the sequence pool of a resulting matrix of the Kronecker product.

103. A non-transitory computer-readable medium storing computer executable code, the code when executed by a processor of a base station causes the processor to:
identify a discrete Fourier transform (DFT) matrix including a number of rows and columns based on scheduled physical uplink control channel (PUCCH) resources assigned to at least one user equipment (UE), the PUCCH resources including a number of symbols in a time domain and a number of sub-carriers in a frequency domain;

receive a PUCCH transmission on the scheduled PUCCH resources; and correlate the received PUCCH transmission with each codepoint of the DFT matrix to select a payload value of uplink control information (UCI) sent by the at least one UE that corresponds to the codepoint of the DFT matrix with a best correlation.

104. The non-transitory computer-readable medium of clause 103, wherein the code to correlate comprises code to perform a fast Fourier transform (FFT) operation on the received PUCCH transmission and the DFT matrix.

105. The non-transitory computer-readable medium of clause 103 or 104, wherein the code to identify the DFT matrix based on the scheduled PUCCH resources comprises code to identify a separate DFT matrix for each hop of a frequency hopping pattern.

106. The non-transitory computer-readable medium of any of clauses 103-105, wherein the code to correlate the received PUCCH transmission comprises code to rate match around a demodulation reference signal (DMRS).

107. The non-transitory computer-readable medium of any of clauses 103-106, further comprising code to determine a Kronecker product between the DFT matrix and a cell specific sequence, wherein each codepoint is selected from a sequence pool of a resulting matrix of the Kronecker product.

108. The non-transitory computer-readable medium of any of clauses 103-107, wherein the DFT matrix is a MN×MN matrix, where N is the number of symbols and M is the number of sub-carriers.

109. The non-transitory computer-readable medium of any of clauses 103-108, wherein the code to correlate the received PUCCH transmission with each codepoint of the DFT matrix comprises code to determine a UE that sent the PUCCH transmission based on a codebook index of the codepoint of the DFT matrix with the best correlation.

110. The non-transitory computer-readable medium of any of clauses 103-109, further comprising code to transmit signaling indicating one or more of PUCCH resources, an oversampling factor, a codebook, or a codebook index for the at least one UE.

111. A non-transitory computer-readable medium storing computer executable code, the code when executed by a processor of a base station causes the processor to:
identify a discrete Fourier transform (DFT) matrix including a number of rows and columns based on at least an oversampling factor and a number of symbols in a time domain of scheduled physical uplink control channel (PUCCH) resources for one or more user equipment (UEs);
receive one or more PUCCH transmissions on the scheduled PUCCH resources;
correlate each of the one or more PUCCH transmissions with each codepoint of the DFT matrix to select a payload value of uplink control information (UCI) sent by a respective UE that corresponds to the codepoint of the DFT matrix with a best correlation for a respective PUCCH transmission of the one or more PUCCH transmissions; and
determine the respective UE that sent the respective PUCCH transmission based on a codebook index of the codepoint of the DFT matrix with the best correlation.

112. The non-transitory computer-readable medium of clause 111, wherein the DFT matrix is based on an ON×ON matrix, where O is the oversampling factor and N is the number of symbols.

113. The non-transitory computer-readable medium of clause 112, wherein the code to identify the DFT matrix further comprises selecting an ON×N sub-matrix of the ON×ON matrix as the DFT matrix.

114. The non-transitory computer-readable medium of any of clauses 111-113, further comprising code to transmit signaling indicating the oversampling factor, the codebook, and an index for the UE.

115. The non-transitory computer-readable medium of clause 114, wherein the signaling is one of a radio resource control (RRC) message, a media access control-control element (MAC-CE), or a downlink control information (DCI).

116. The non-transitory computer-readable medium of any of clauses 111-115, further comprising code to determine a Kronecker product between the DFT matrix and a cell specific sequence, wherein each codepoint is selected from a sequence pool of a resulting matrix of the Kronecker product.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising, at a user equipment (UE):
identifying a discrete Fourier transform (DFT) matrix including a number of rows and columns based on scheduled physical uplink control channel (PUCCH) resources including a number of symbols (N) in a time domain and a number of sub-carriers (M) in a frequency domain, wherein the DFT matrix is a MN×MN matrix;
selecting a codepoint from a sequence pool derived from the DFT matrix based on a payload value of uplink control information (UCI) to be transmitted on the PUCCH resources; and
transmitting the selected codepoint on the scheduled PUCCH resources.

2. The method of claim 1, wherein identifying the DFT matrix based on the scheduled PUCCH resources comprises identifying a separate DFT matrix for each hop of a frequency hopping pattern.

3. The method of claim 1, wherein transmitting the selected codepoint on the scheduled PUCCH resources comprises rate matching around a demodulation reference signal (DMRS) or puncturing the transmission of the selected codepoint with the DMRS.

4. The method of claim 1, further comprising determining a Kronecker product between the DFT matrix and a cell specific sequence, wherein the codepoint is selected from the sequence pool of a resulting matrix of the Kronecker product.

5. The method of claim 1, wherein selecting the codepoint from the DFT matrix comprises oversampling the DFT matrix based on a codebook index assigned to the UE.

6. The method of claim 1, further comprising receiving signaling indicating one or more of the PUCCH resources, an oversampling factor, a codebook, or a codebook index for the UE.

7. A method of wireless communication, comprising, at a user equipment (UE):
identifying a discrete Fourier transform (DFT) matrix including a number of rows and columns for scheduled physical uplink control channel (PUCCH) resources based on at least an oversampling factor (O) and the scheduled PUCCH resources, wherein the DFT matrix is an ON×ON matrix, where N is based on at least a number of symbols in a time domain of the scheduled PUCCH resources;
selecting a codepoint from a sequence pool derived from the DFT matrix based on a codebook assigned to the UE and a payload value of uplink control information (UCI); and
transmitting the selected codepoint on the scheduled PUCCH resources.

8. The method of claim 7, wherein selecting a codepoint from the DFT matrix based on a codebook assigned to the UE comprises selecting an ON×N sub-matrix of the ON×ON matrix based on the codebook.

9. The method of claim 8, wherein N is a product of the number of symbols in the time domain of the scheduled PUCCH resources and a number of sub-carriers in a frequency domain of the scheduled PUCCH resources.

10. The method of claim 7, further comprising receiving signaling indicating the oversampling factor, the codebook, and a codebook index for the UE.

11. The method of claim 10, wherein the signaling is one of a radio resource control (RRC) message, a media access control-control element (MAC-CE), or a downlink control information (DCI).

12. The method of claim 7, wherein the codebook comprises rows of the DFT matrix selected based on the oversampling factor.

13. The method of claim 7, further comprising determining a Kronecker product between the DFT matrix and a cell specific sequence, wherein the codepoint is selected from the sequence pool of a resulting matrix of the Kronecker product.

14. A method of wireless communication for a base station, comprising:
identifying a discrete Fourier transform (DFT) matrix including a number of rows and columns based on scheduled physical uplink control channel (PUCCH) resources assigned to at least one user equipment (UE), the PUCCH resources including a number of symbols (N) in a time domain and a number of sub-carriers (M) in a frequency domain, wherein the DFT matrix is a MN×MN matrix;
receiving a PUCCH transmission on the scheduled PUCCH resources; and
correlating the received PUCCH transmission with each codepoint of the DFT matrix to select a payload value of uplink control information (UCI) sent by the at least one UE that corresponds to the codepoint of the DFT matrix with a best correlation.

15. The method of claim 14, wherein the correlating comprises performing a fast Fourier transform (FFT) operation on the received PUCCH transmission and the DFT matrix.

16. The method of claim 14, wherein identifying the DFT matrix based on the scheduled PUCCH resources comprises identifying a separate DFT matrix for each hop of a frequency hopping pattern.

17. The method of claim 14, wherein correlating the received PUCCH transmission comprises rate matching around a demodulation reference signal (DMRS).

18. The method of claim 14, further comprising determining a Kronecker product between the DFT matrix and a cell specific sequence, wherein each codepoint is selected from a sequence pool of a resulting matrix of the Kronecker product.

19. The method of claim 14, wherein correlating the received PUCCH transmission with each codepoint of the DFT matrix comprises determining a UE that sent the PUCCH transmission based on a codebook index of the codepoint of the DFT matrix with the best correlation.

20. The method of claim 14, further comprising transmitting signaling indicating one or more of PUCCH resources, an oversampling factor, a codebook, or a codebook index for the at least one UE.

21. A method of wireless communication for a base station, comprising:
identifying a discrete Fourier transform (DFT) matrix including a number of rows and columns based on at least an oversampling factor (O) and a number of symbols (N) in a time domain of scheduled physical uplink control channel (PUCCH) resources for one or more user equipment (UEs), wherein the DFT matrix is based on an ON×ON matrix;
receiving one or more PUCCH transmissions on the scheduled PUCCH resources;
correlating each of the one or more PUCCH transmissions with each codepoint of the DFT matrix to select a payload value of uplink control information (UCI) sent by a respective UE that corresponds to the codepoint of the DFT matrix with a best correlation for a respective PUCCH transmission of the one or more PUCCH transmissions; and determining the respective UE that sent the respective PUCCH transmission based on a codebook index of the codepoint of the DFT matrix with the best correlation.

22. The method of claim 21, wherein identifying the DFT matrix further comprises selecting an ON×N sub-matrix of the ON×ON matrix as the DFT matrix.

23. The method of claim 21, further comprising transmitting signaling indicating the oversampling factor, the codebook, and an index for the UE.

24. The method of claim 23, wherein the signaling is one of a radio resource control (RRC) message, a media access control-control element (MAC-CE), or a downlink control information (DCI).

25. The method of claim 21, further comprising determining a Kronecker product between the DFT matrix and a cell specific sequence, wherein each codepoint is selected from a sequence pool of a resulting matrix of the Kronecker product.

* * * * *